United States Patent
Jung et al.

(10) Patent No.: US 9,813,130 B2
(45) Date of Patent: Nov. 7, 2017

(54) METHOD AND DEVICE FOR ESTIMATING ANGLE

(71) Applicant: Samsung Electronics Co., Ltd., Gyeonggi-do (KR)

(72) Inventors: Doyoung Jung, Gyeonggi-do (KR); Changyeul Kwon, Gyeonggi-do (KR); Sungrok Yoon, Seoul (KR); Seok-Yong Lee, Seoul (KR); Ohyun Jo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/074,974

(22) Filed: Mar. 18, 2016

(65) Prior Publication Data
US 2016/0277089 A1 Sep. 22, 2016

(30) Foreign Application Priority Data
Mar. 20, 2015 (KR) .................. 10-2015-0038991

(51) Int. Cl.
*H04B 7/02* (2017.01)
*H04B 7/06* (2006.01)
*G06F 3/0486* (2013.01)
*H04L 29/08* (2006.01)
*G06F 3/0488* (2013.01)
*G06F 3/0346* (2013.01)

(52) U.S. Cl.
CPC ......... *H04B 7/0617* (2013.01); *G06F 3/0346* (2013.01); *G06F 3/0486* (2013.01); *G06F 3/04883* (2013.01); *H04L 67/06* (2013.01)

(58) Field of Classification Search
CPC ............... H04B 7/0617; G06F 3/0486
USPC ........................... 375/267; 370/329
See application file for complete search history.

(56) References Cited

U.S. PATENT DOCUMENTS

| 2013/0282793 A1 | 10/2013 | Swings et al. | |
| 2014/0045511 A1 | 2/2014 | Li et al. | |
| 2016/0006496 A1* | 1/2016 | Schneider | H04B 3/54 375/267 |
| 2016/0099763 A1* | 4/2016 | Chen | H04B 7/0617 370/329 |

* cited by examiner

Primary Examiner — Daniel Washburn
Assistant Examiner — Fitwi Hailegiorgis

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure relates to an operating method of an electronic device for estimating an angle for another device, including: determining errors for candidate angles of channel measurement values corresponding to a plurality of beams for the other device; determining distances between the angle of a beam determined through beam training with the other device and at least one candidate angle; and estimating an angle for the other device based on the distances and the errors. In addition, the present disclosure also includes embodiments different from the above described embodiment.

20 Claims, 23 Drawing Sheets

METHOD AND DEVICE FOR ESTIMATING ANGLE

CROSS-REFERENCE TO RELATED APPLICATION AND CLAIM OF PRIORITY

The present application is related to and claims benefit under 35 U.S.C. §119(a) to Korean Application Serial No. 10-2015-0038991, which was filed in the Korean Intellectual Property Office on Mar. 20, 2015, the entire content of which is hereby incorporated by reference.

TECHNICAL FIELD

The present disclosure relates to an estimation of an angle in an electronic device.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, with the development of communication technologies, a variety of services based on wireless connection technologies between electronic devices have been developed. For example, services have been provided, such as sharing content stored in one electronic device with another electronic device, outputting the content through hardware of the other device, etc. In this case, not only a communication connection between the electronic devices but also various pieces of information on surrounding environments of the electronic devices may be used to provide a more user-friendly user interface (UI)/user experience (UX). As a representative example, the locations of the electronic devices may be used.

The locations of the electronic devices may be acquired by a variety of methods. A method using a radio signal may be employed when the electronic devices in a close range mutually estimate the locations thereof. However, the radio signal may be distorted on account of signal attenuation by a wireless channel, jamming by an obstacle, etc. so that it is not easy to accurately estimate the locations.

SUMMARY

To address the above-discussed deficiencies, it is a primary object to provide a device and method for estimating the location of another device in an electronic device.

Another embodiment of the present disclosure provides a device and method for estimating an angle for another device in an electronic device.

Yet another embodiment of the present disclosure provides a device and method for estimating an angle for another device using channel measurement values in an electronic device.

Yet another embodiment of the present disclosure provides a device and method for estimating an angle for another device using a beam training result in an electronic device.

Yet another embodiment of the present disclosure provides a device and method for providing a user interface (UI)/user experience (UX) for sharing content using an angle for another device in an electronic device.

A method of operating an electronic device, according to an embodiment of the present disclosure, includes: determining errors for candidate angles of channel measurement values corresponding to a plurality of beams for another device; determining distances between the angle of a beam determined through beam training with the other device and at least one candidate angle; and estimating an angle for the other device based on the distances and the errors.

An electronic device, according to another embodiment of the present disclosure, includes a processor that: determines errors for candidate angles of channel measurement values corresponding to a plurality of beams for another device; determines distances between the angle of a beam determined through beam training with the other device and at least one candidate angle; and estimates an angle for the other device based on the distances and the errors.

An electronic device estimates an angle for another device using a beam training result so that the electronic device can more accurately estimate the angle.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, the operational principle of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms which will be described below are terms defined in consideration of the functions in the present disclosure, and may be different according to users, intentions of the users, or customs. Therefore, the definition should be made based on the overall contents of the present specification.

The present disclosure describes a technique by which an electronic device estimates the location of a neighboring electronic device. In particular, the present disclosure describes a technique for estimating an angle for the neighboring electronic device.

Terms referring to devices, signals, connection states, etc., as used herein, are exemplified for the convenience of description. Therefore, the present disclosure is not limited to the terms, which will be described below, and other terms referring to objects having equivalent technical meanings may be used.

In the present disclosure, the electronic device having a communication function can be one of a portable electronic device, a smart phone, a portable terminal, a mobile phone, a mobile pad, a media player, a tablet computer, a handheld computer, and a Personal Digital Assistant (PDA). Furthermore, the electronic device can be a device that implements the functions of two or more of the aforementioned devices.

Figure 1:
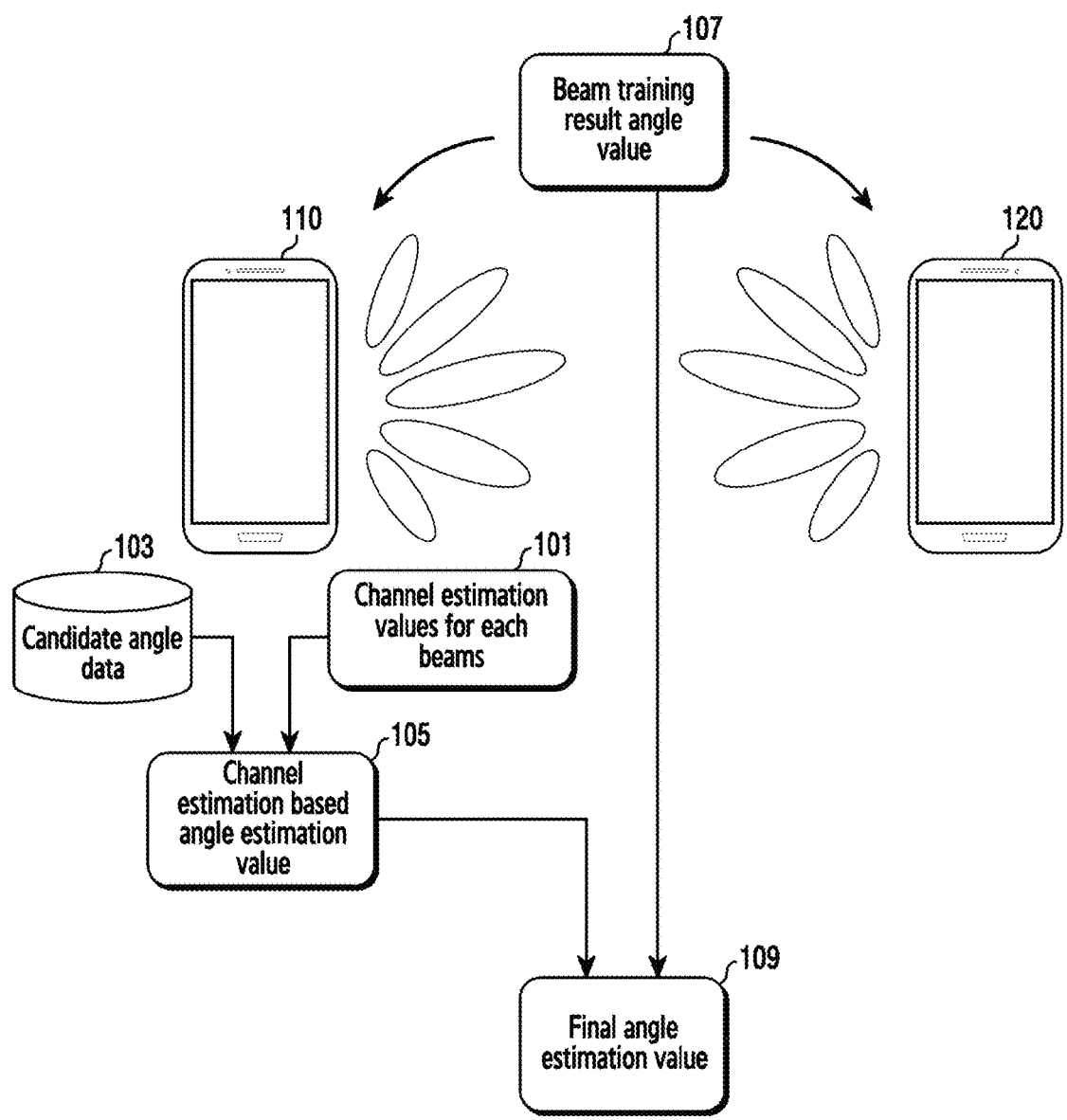
FIG. 1 is a schematic diagram illustrating an angle estimation procedure in an electronic device according to the present disclosure.

FIG. 1 is a schematic diagram illustrating an angle estimation procedure in an electronic device according to the present disclosure. FIG. 1 illustrates values used for estimating an angle and a connection relation thereof, where a device A 110 estimates an angle for a device B 120.

Referring to FIG. 1, the device A 110 and the device B 120 can form a plurality of beams. Here, the beams include transmission beams and reception beams. According to various embodiments of the present disclosure, the angle is estimated using the plurality of beams formed by the device A 110. Namely, the device A 110, which estimates the angle, may form the plurality of beams having different orientations by performing beamforming using a plurality of antennas or an antenna array. However, according to various embodiments of the present disclosure, the device B 120, which is not the main agent that estimates the angle, may not support beamforming.

The device A 110 can determine a channel estimation based angle estimation value 105 from channel estimation values 101 according to beams and candidate angle data 103. Here, the channel estimation refers to a procedure of calculating channel values, namely the channel estimation values 101, for one or more beams. The channel estimation values 101, according to the beams, refer to values that represent channels that are estimated using signals transmitted or received through the respective beams formed by the device A 110. The channel measurement value for one beam can vary according to a relative relation between the location of the device B 120 and the aiming direction of the beam. Accordingly, the channel estimation values 101, according to the beams, can be determined to be a combination of various values according to the location of the device B 120. The candidate angle data 103 includes combinations of pre-measured or pre-calculated channel measurement values according to angles. Namely, the candidate angle data 103 includes channel measurement values, according to the beams, for a plurality of candidate angles. Accordingly, the channel estimation based angle estimation value 105 can be determined by searching for a combination of channel measurement values that is most similar to the channel estimation values 101, according to the beams, that are measured by the device A 110. Here, the angle estimation value 105 can be defined with respect to a direction perpendicular to a specific side (e.g., the front side, the back side, or the plan side) of the device A 110, and can include at least one of a horizontal-axis angle and a vertical-axis angle.

The device A 110 can determine the final angle estimation value 109 from the channel estimation based angle estimation value 105 and a beam training result angle value 107. The beam training refers to a procedure of determining an optimal beam, or an optimal beam pair, which is used for data transmission/reception between the device A 110 and the device B 120. Since the optimal beam of the device A 110 is more likely to be directed toward the device B 120, the optimal beam of the device A 110 is associated with an angle for the device B 120. Accordingly, the device A 110 can determine the final angle estimation value 109 based on the channel estimation based angle estimation value 105 and the beam training result angle value 107 that refers to the optimal beam angle determined through the beam training. Namely, the device A 110 can compensate for the channel estimation based angle estimation value 105 using the beam training result angle value 107. In other words, the device A 110 can compensate for the beam training result angle value 107 using the channel estimation based angle estimation value 105.

Figure 2:
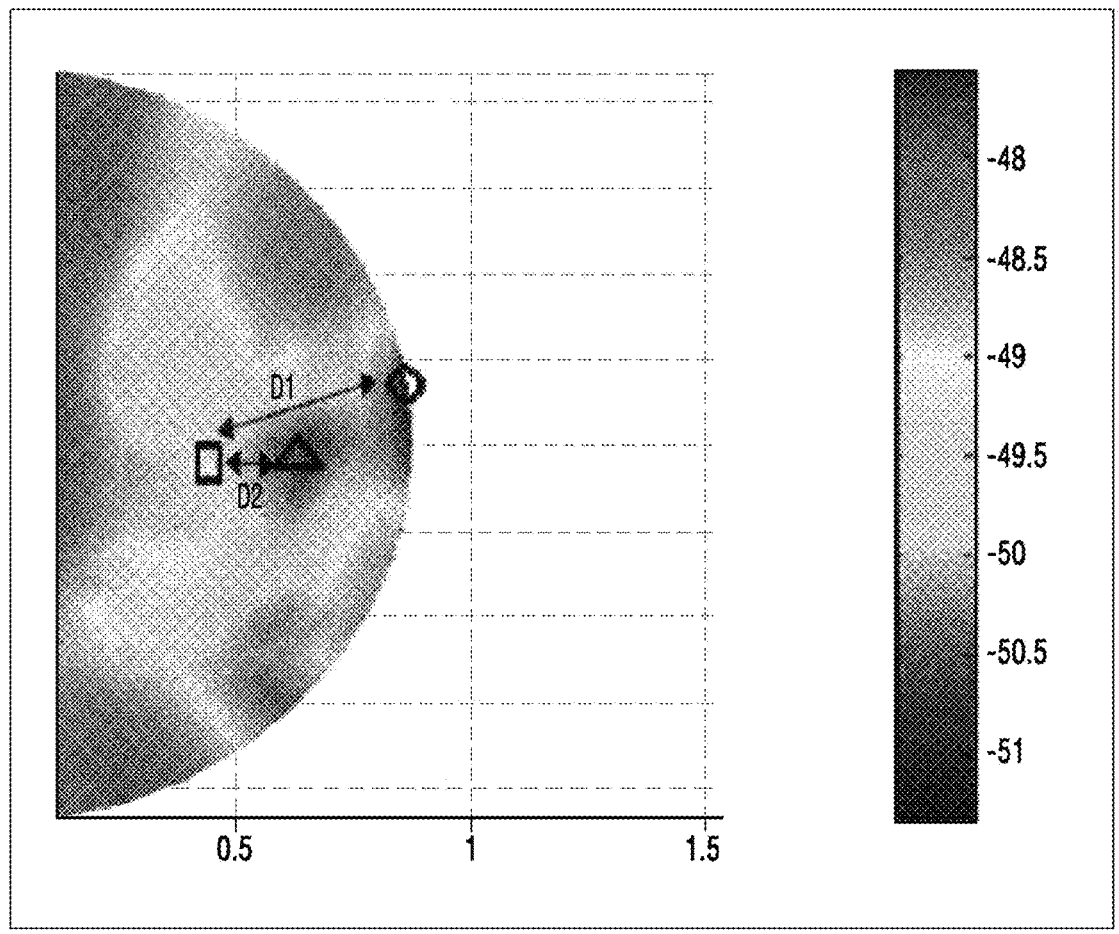
FIG. 2 illustrates a change in a measurement value according to an estimation of an angle in the electronic device according to the present disclosure.

FIG. 2 illustrates a change in a measurement value according to an estimation of an angle in the electronic device according to the present disclosure. FIG. 2 illustrates the channel estimation based angle estimation value 105, the beam training result angle value 107, and the final angle estimation value 109 according to the angle estimation procedure described above with reference to FIG. 1. In FIG. 2, D1 denotes a difference between the channel estimation based angle estimation value 105 and the beam training result angle value 107, and D2 denotes a difference between the beam training result angle value 107 and the final angle estimation value 109.

In the case of FIG. 2, another device to be measured is located at an angle of 30°. In this case, the channel estimation based angle estimation value 105 is 58.8°, and the final angle estimation value 109, considering the distance from the beam training result angle estimation value 107, is 36.8°. In other words, as illustrated in FIG. 2, the angle estimation value 105 is determined to be about 58.8° in the case of using the channel measurement values only, and the final angle estimation value 109 is determined to be about 36.8° in the case of considering the beam training result angle estimation value 107 together. Namely, by considering the beam training result angle estimation value 107, the final angle estimation value 109 can be more accurate than the channel estimation based angle estimation value 105.

Figure 3:
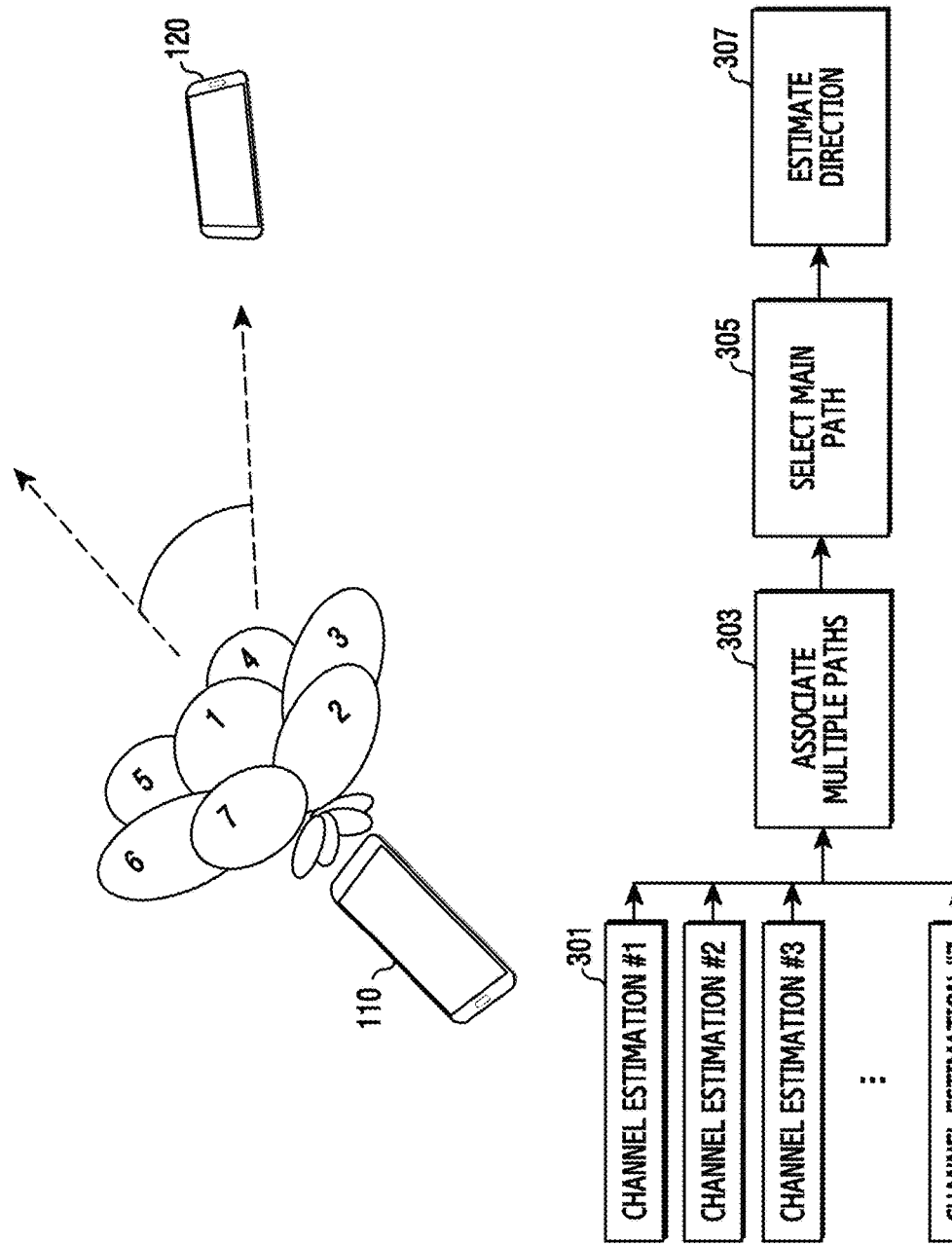
FIG. 3 illustrates an estimation of an angle based on channel measurement values in the electronic device according to the present disclosure.

FIG. 3 illustrates an estimation of an angle based on channel measurement values in the electronic device according to the present disclosure. FIG. 3 illustrates a method for generating the channel estimation values 101 according to beams, which are illustrated in FIG. 1. In FIG. 3, the device A 110 is illustrated as using seven beams.

Referring to FIG. 3, in step 301, the device A 110 generates channel measurement values for the device B 120 by using the seven beams. As many channel measurement values as the beams used by the device A 110 are generated. The channel measurement value can be defined as the phase and size that represent a channel, signal strength, a Channel Impulse Response (CIR), the quality of the channel, or a combination thereof. For the channel estimation, the device A 110 can receive signals from the device B 120 through different reception beams. Alternatively, the device A 110 can transmit signals through different transmission beams and can receive channel measurement values from the device B 120.

In step 303, the device A 110 associates multiple paths. Namely, the device A 110 compares a combination of the channel measurement values for the respective beams with combinations of channel values of pre-defined candidate angles. Specifically, the device A 110 calculates errors between the channel measurement values and the combinations of the channel values of the candidate angles. An error can be calculated for each candidate angle. For example, the error can be represented as a Mean Square Error (MSE) by Equation 1 below.

$$\mathrm{MSE} = \|e - \alpha G\|^2 \qquad [\text{Equation 1}]$$

In Equation 1 above, MSE denotes errors between channel measurement values and combinations of channel values of candidate angles, e denotes a channel measurement value, a denotes a normalization factor, and G, as a pre-calculated reference, denotes a channel value of a candidate angle. Here, the channel measurement value can include a compensated CIR. The normalization factor, which is a variable for scaling according to distances, can vary according to the distance between devices. In Equation 1 above, the channel measurement value e and the channel value of the candidate angle G can be a single channel value or a vector of channel values. In cases where the Equation 1 above is applied to a single channel value, an error for a combination of channel values corresponding to a plurality of beams can be the sum, or the weighted sum, of errors according to the beams.

In step 305, the device A 110 selects the main path. Namely, the device A 110 selects a combination of channel values based on the result obtained by comparing the channel measurement values with the combinations of channel values of the candidate angles. In this case, a combination of channel values that has a minimum error can be selected.

In step 307, the device A 110 estimates a direction. In other words, the device A 110 identifies the direction, namely, the angle that corresponds to the combination of channel values that has been selected in step 305. Accordingly, one candidate angle that minimizes the error from the channel measurement values generated in step 301 (for example, MSE) can be estimated as an angle for the device B 120.

In cases where the procedure illustrated in FIG. 3 is included in the angle estimation procedure illustrated in FIG. 1, the device A 110 can estimate the final angle based on the angle estimated in step 307 and the optimal beam angle determined according to the beam training result. In this case, the device A 110 can directly use the angle, or can use the error (e.g., MSE). When the error is used, the step 307 can be omitted. Furthermore, when using the error, the device A 110 can use a plurality of errors instead of a minimum error. In this case, the step 305 can be omitted.

Figure 4:
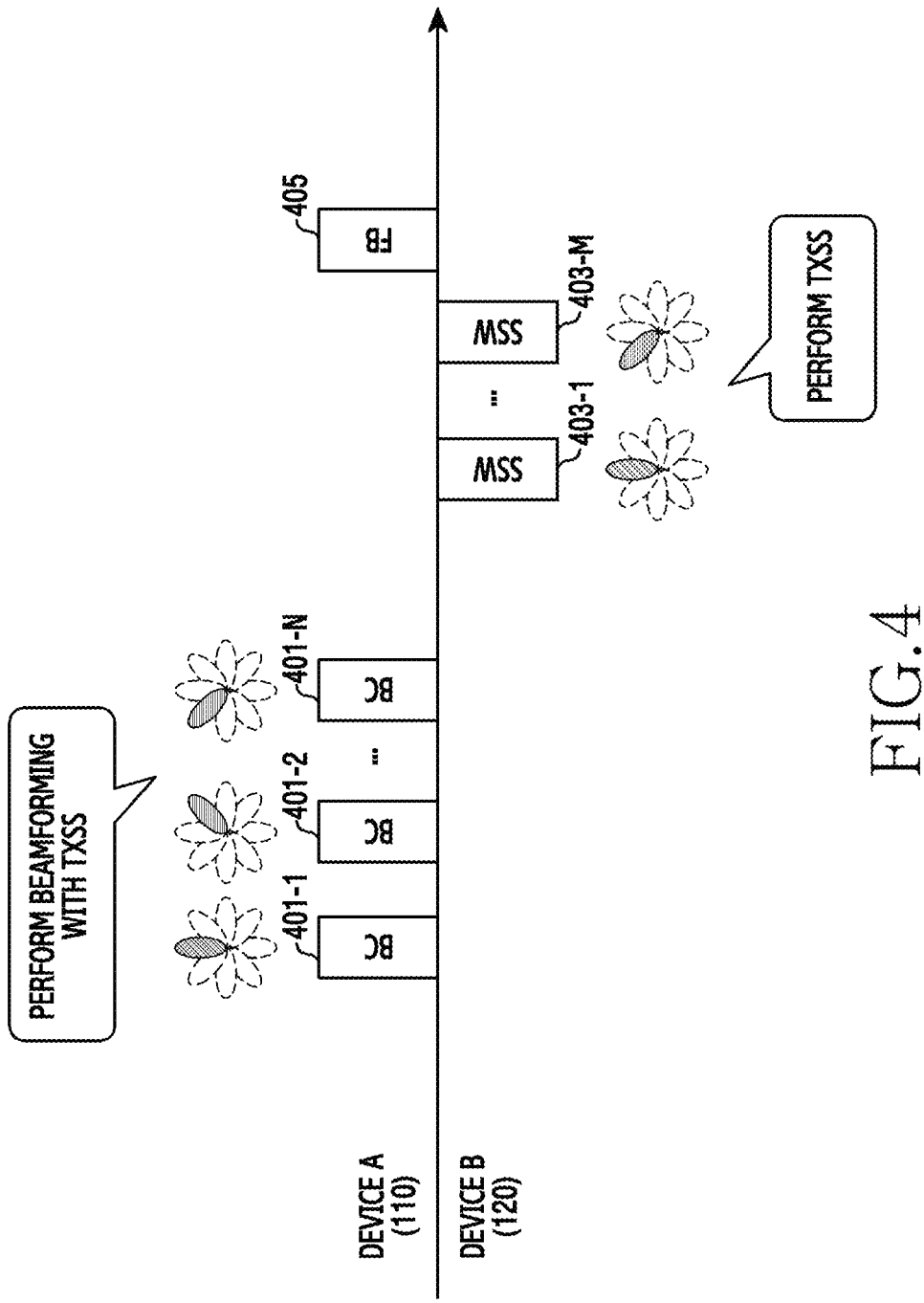
FIG. 4 illustrates an example of a beam training procedure in the electronic device according to the present disclosure.

FIG. 4 illustrates an example of a beam training procedure in the electronic device according to the present disclosure. FIG. 4 illustrates a method for determining an optimal beam, or an optimal beam pair, between the device A 110 and the device B 120.

Referring to FIG. 4, the device A 110 performs a transmission sector sweep (TXSS). The transmission sector sweep can be referred to as a 'sector level sweep (SLS).' Namely, the device A 110 beamforms beacon signals in supportable beam directions and sequentially transmits the beamformed signals 401-1 to 401-N. The signals can be referred to as 'beacon signals.' In this case, the device B 120 attempts to detect the beamformed signals 401-1 to 401-N. The device B 120 can receive the beacon signals 401-1 to 401-N through an omni-directional reception beam without reception beamforming. Accordingly, the device B 120 can determine an optimal transmission beam. Although not illustrated in FIG. 4, the device B 120 can feed back information for notifying of the optimal transmission beam.

Thereafter, the device B 120 performs a transmission sector sweep. In this case, the device A 110 receives training signals, which are transmitted from the device B 120, through an omni-directional reception beam without reception beamforming and then transmits feedback information 405 to the device B 120. Here, the feedback information 405 can be transmitted without beamforming, namely, through an omni-directional beam. The feedback information 405 includes information for notifying of the optimal beam determined by the device A 110. Since a similarity between a transmission beam and a reception beam is accepted by virtue of channel reciprocity, the device B 120 can determine an optimal reception beam based on the feedback information 405.

Figure 5:
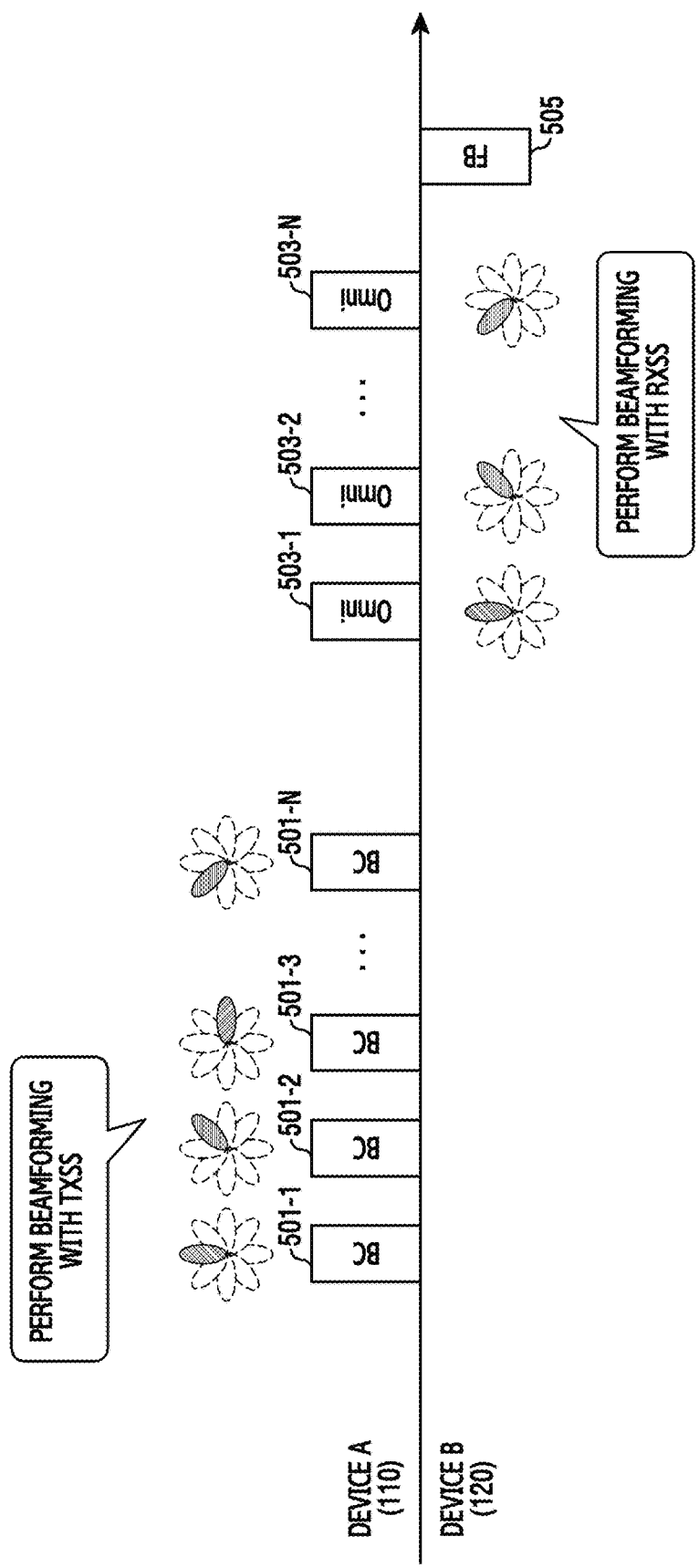
FIG. 5 illustrates another example of a beam training procedure in the electronic device according to the present disclosure.

FIG. 5 illustrates another example of a beam training procedure in the electronic device according to the present disclosure. FIG. 5 illustrates another method for determining an optimal beam, or an optimal beam pair, between the device A 110 and the device B 120.

Referring to FIG. 5, the device A 110 performs a transmission sector sweep. The transmission sector sweep can be referred to as a 'sector level sweep (SLS).' Namely, the device A 110 beamforms signals in supportable beam directions and sequentially transmits the beamformed beacon signals 501-1 to 501-N. The signals can be referred to as 'beacon signals.' In this case, the device B 120 attempts to detect the beamformed signals 501-1 to 501-N. The device B 120 can receive the beacon signals 501-1 to 501-N through an omni-directional reception beam without reception beamforming. Accordingly, the device B 120 can determine an optimal transmission beam.

Thereafter, the device A 110 sequentially transmits signals 503-1 to 503-N through an omni-directional beam. In this case, the device B 120 performs reception beamforming. Namely, the device B 120 performs a reception sector sweep. Accordingly, the device B 120 can determine an optimal reception beam. Next, the device B 120 transmits feedback information 505 for notifying the optimal transmission beam and the optimal reception beam. The feedback information 405 can include at least one of: information for indicating the optimal transmission beam; information for indicating the optimal reception beam; and channel quality by virtue of a combination of the optimal transmission beam and the optimal reception beam.

The device A 110 and the device B 120 can determine an optimal beam, or an optimal beam pair, to be used for data communication by performing the beam training as illustrated in FIG. 4 or 5. However, the procedures illustrated in FIGS. 4 and 5 are merely for illustrative purposes, and another beam training procedure can be applied. For example, the device A 110 and the device B 120 can exchange, in advance, information required for the beam training through another wireless connection technique, except the wireless connection technique to which the results of the beam training procedures are to be applied. For example, through the other wireless connection technique, the device A 110 and the device B 120 can share information on a time interval in which the beam training is to be performed. Alternatively, when the device A 110 performs beam training together with a plurality of neighboring devices, except the device B 120, the device A 110 can allocate slots to transmit training signals to the plurality of neighboring devices and can notify of the result of the slot allocation through the other wireless connection technique.

Figure 6:
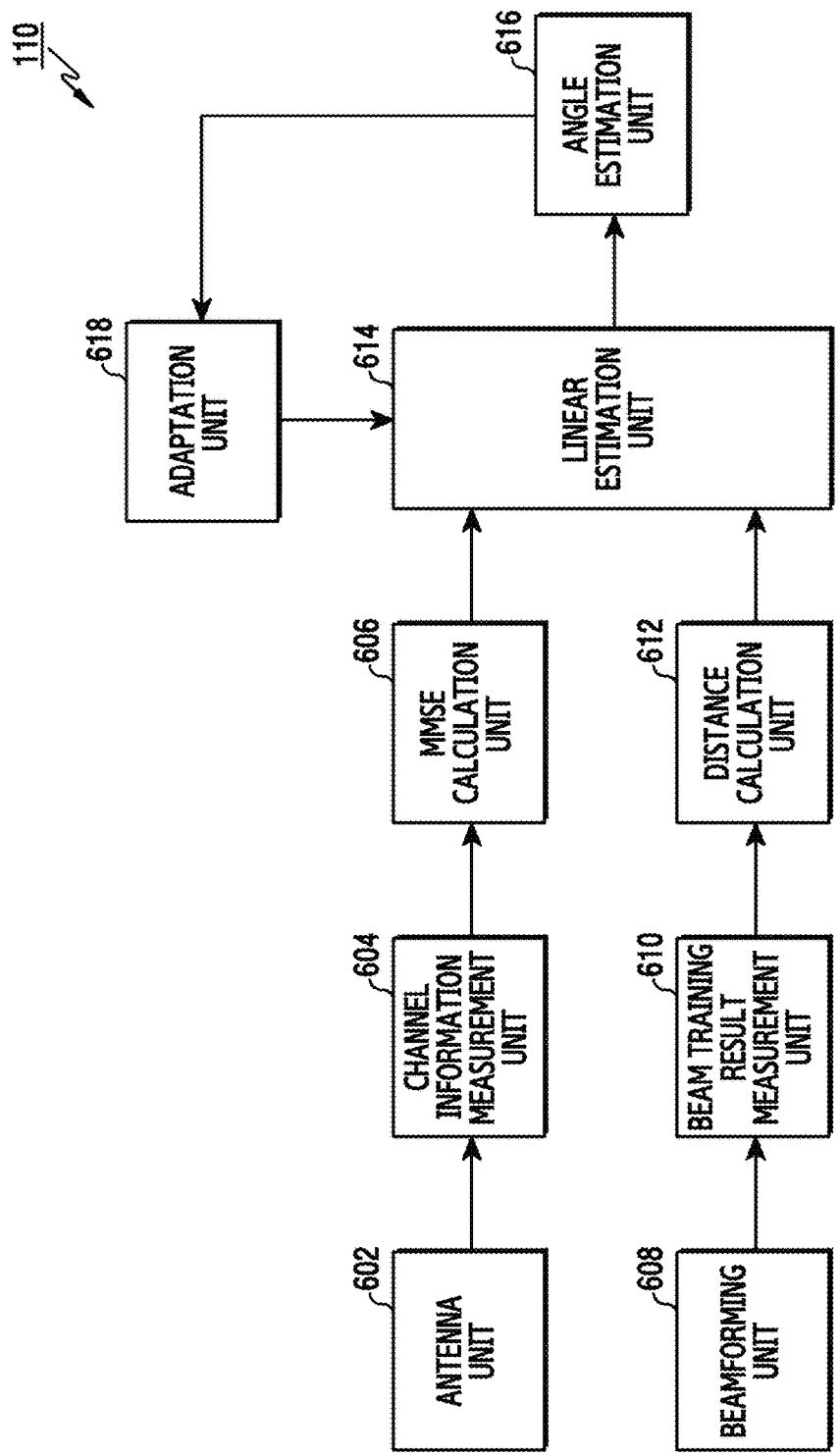
FIG. 6 is a block diagram of an electronic device according to the present disclosure.

FIG. 6 is a block diagram of an electronic device according to the present disclosure. FIG. 6 illustrates the configuration of device A 110. Terms, such as 'unit', 'device', etc., as used herein, refer to a unit for processing at least one function or operation, and the unit can be implemented by hardware, software, or a combination thereof.

Referring to FIG. 6, the device A 110 includes an antenna unit 602, a channel information measurement unit 604, a minimum MSE calculation unit 606, a beamforming unit 608, a beam training result measurement unit 610, a distance calculation unit 612, a linear estimation unit 614, an angle estimation unit 616, and an adaptation unit 618.

The antenna unit 602 radiates a signal through a wireless channel, or detects a signal transmitted through the wireless channel. The antenna unit 602 includes a plurality of antennas or at least one antenna array. The channel information measurement unit 604 estimates channel values. Specifically, the channel information measurement unit 604 can estimate channel values for beams supported by the device A 110. Namely, the channel information measurement unit 604 creates a combination of channel measurement values according to the beams. The MMSE calculation unit 606 calculates errors between the channel values and combinations of channel values of candidate angles. For example, the MMSE calculation unit 606 can calculate the errors by Equation 1 above.

The beamforming unit 608 performs beamforming in order to increase a signal gain by assigning orientations to transmission and reception signals. Namely, the beamforming unit 608 can form a transmission beam by adjusting the phase and magnitude of a transmission signal for each antenna or antenna element. Alternatively, the beamforming unit 608 can form a reception beam by adjusting the phase and magnitude of a reception signal for each antenna or antenna element. The beam training result measurement unit 610 controls a beam training procedure for determining an optimal beam, or an optimal beam pair, for the counterpart device. In this way, the beam training result measurement unit 610 can determine the optimal beam for the counterpart terminal. The optimal beam includes at least one of a transmission beam and a reception beam. Further, the beam training result measurement unit 610 converts the optimal beam into an angle value. In general, the optimal beam determined through the beam training is referred to by a beam index. Accordingly, in order to use the angle of the optimal beam, the beam training result measurement unit 610 identifies the angle corresponding to the index of the optimal beam. The distance calculation unit 612 calculates a distance between the angle of the optimal beam and at least one candidate angle. Here, the distance can be defined in various manners. For example, the distance can be defined as at least one, or a combination, of a Manhattan distance, a Euclidean distance, or a Hamming distance.

The linear estimation unit 614 calculates the weighted sum of the errors for the candidate angles calculated by the MMSE calculation unit 606 and the distances determined by the distance calculation unit 612. In this way, one weighted sum can be determined for each candidate angle. For example, the linear estimation unit 614 can determine the weighted sum by Equation 2 below.

$$WS_k = W_E \times E_k + W_D \times D_k \qquad \text{[Equation 2]}$$

In Equation 2 above, WSk denotes a weighted sum for candidate angle k, WE denotes a weighting value for an error, WD denotes a weighting value for a distance, Ek denotes an error between a channel estimation based angle estimation value and candidate angle k, and Dk denotes a distance between a beam angle determined through beam training and candidate angle k.

According to an embodiment of the present disclosure, the linear estimation unit 614 can calculate the weighted sums for all candidate angles. Namely, the linear estimation unit 614 can calculate the weighted sums for the entire section of a candidate angle. According to another embodiment of the present disclosure, the linear estimation unit 614 can calculate the weighted sums for some candidate angles. For example, the linear estimation unit 614 can select N candidate angles having small errors, that is, can select N candidate angles in an ascending order of the error, and can calculate the weighted sums for the N candidate angles. In this case, the gain of an operation reduction is generated. The angle estimation unit 616 determines an angle for the counterpart device based on the plurality of weighted sums calculated by the linear estimation unit 614. For example, the angle estimation unit 616 can select one candidate angle having the smallest weighted sum as an angle for the counterpart device.

Using the angle estimated by the angle estimation unit 616, the adaptation unit 618 adjusts weighting values used by the linear estimation unit 614. To this end, the device A 110 can perform an estimation of an angle for the counterpart device that is located at the known angle, and can provide the angle estimation result and the angle of the counterpart device to the adaptation unit 618. Accordingly, the adaptation unit 618 can optimize the weighting values based on the estimated angle and the actual angle.

Figure 7:
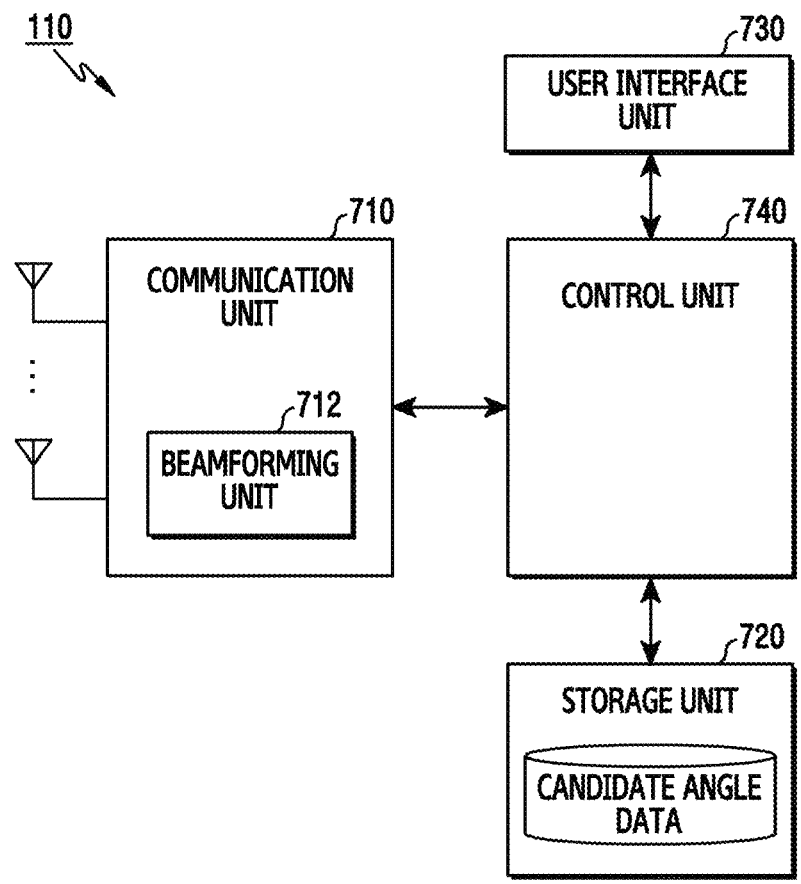
FIG. 7 is a block diagram of an electronic device according to the present disclosure.

FIG. 7 is a block diagram of an electronic device according to the present disclosure. FIG. 7 illustrates another configuration of device A 110. Terms, such as 'unit', 'device', etc., as used herein, refer to a unit for processing at least one function or operation, and the unit can be implemented by hardware, software, or a combination thereof.

Referring to FIG. 7, the device A 110 includes a communication unit 710, a storage unit 720, a user interface unit 730, and a control unit 740.

The communication unit 710 performs functions for transmitting and receiving signals through a wireless channel. For example, the communication unit 710 performs a conversion between a baseband signal and a bit string according to the physical layer standard of a system. For example, the communication unit 710, when transmitting data, generates complex symbols by encoding and modulating a transmission bit string. Furthermore, the communication unit 710, when receiving data, restores a reception bit string by demodulating and decoding a baseband signal. In addition, the communication unit 710 subjects a baseband signal to up-conversion to a Radio Frequency (RF) band signal to transmit the RF band signal through an antenna and subjects an RF band signal received through the antenna to down-conversion to a baseband signal. For example, the communication unit 710 can include a transmission filter, a reception filter, an amplifier, a mixer, an oscillator, a Digital-to-Analog Converter (DAC), an Analog-to-Digital Converter (ADC), etc.

Further, the communication unit 710 can include a plurality of RF chains. In addition, the communication unit 710 can include a beamforming unit 712 that performs beamforming. For the beamforming, the communication unit 710 can adjust the phases and magnitudes of signals that are transmitted and received through a plurality of antennas or antenna elements. In addition, the communication unit 710 can include a plurality of communication modules in order to support a plurality of different wireless connection techniques. Moreover, the communication unit 710 can include different communication modules for processing signals in different frequency bands. For example, the different wireless connection techniques can include Bluetooth Low Energy (BLE), Wi-Fi®, WiGig, a cellular network (e.g., Long Term Evolution (LTE)), etc. Further, the different frequency bands can include a Super High Frequency (SHF) band (e.g., 2.5 GHz, 5 GHz, etc.) and a millimeter (mm) wave band (e.g., 60 GHz). The communication unit 710 transmits and receives signals as described above. Accordingly, the communication unit 710 can be referred to as a transmission unit, a reception unit, or a transmission/reception unit.

The storage unit 720 stores data for the operation of the device A 110, such as a basic program, an application program, setting information, etc. In particular, the storage unit 720 can store candidate angle data that includes combinations of channel values corresponding to a plurality of candidate angles. Further, the storage unit 720 provides data stored therein according to a request of the control unit 740.

The user interface unit 730 performs functions for outputting information and detecting a user input. The user interface unit 730 can forward instructions or data, which is input from a user, to the control unit 740. To this end, the user interface unit 730 can include at least one hardware module for the output and input. For example, the hardware module can include at least one of a sensor, a keyboard, a keypad, a speaker, a microphone, a touch screen, a Liquid Crystal Display (LCD), a Light Emitting Diode (LED), a Light-emitting Polymer Display (LPD), an Organic Light Emitting Diode (OLED), an Active Matrix Organic Light Emitting Diode (AMOLED), and Flexible LED (FLED). For example, the user interface unit 730 can provide, to the control unit 740, data on a user's touch input (e.g., tap, press, pinch, stretch, slide, swipe, rotate, etc.) that is input through the touch screen. Further, the user interface unit 730 can output, through an input/output device (e.g., a speaker or a display module), instructions or data that is received from the control unit 740. The user interface unit 730 displays a screen, and hence can be referred to as a 'display unit.' Further, the user interface unit 730 detects a user input, and hence can be referred to as an 'input unit.'

The control unit 740 controls the overall operation of the device A 110. For example, the control unit 740 transmits and receives signals through the communication unit 710. In addition, the control unit 740 can record data in the storage unit 720 and read the data. To this end, the control unit 740 can include at least one processor. For example, the control unit 740 can include a Communication Processor (CP) that controls communication and an Application Processor (AP) that controls an upper layer, such as an application program, etc.

According to the present disclosure, the control unit 740 can estimate an angle for a counterpart device. Specifically, the control unit 740 can estimate channel values according to beams for the counterpart device, calculate errors between the channel values and combinations of channel values of a plurality of candidate angles, and estimate an angle based on the angle of a beam determined through beam training and the errors. For example, the control unit 740 can control the device A 110 to perform the procedures illustrated in FIGS. 8 to 10.

In addition, the control unit 740 can control the user interface unit 730 to display an interface for sharing content with at least one neighboring device. Specifically, the control unit 740 displays at least one neighboring device for content sharing through the user interface unit 730. In this case, the control unit 740 can control to display an item, which represents the at least one neighboring device, in a position of a screen that corresponds to an angle for the at least one neighboring device. For example, the control unit 740 can control the device A 110 to perform the procedures illustrated in FIGS. 15, 19, and 21.

Figure 8:
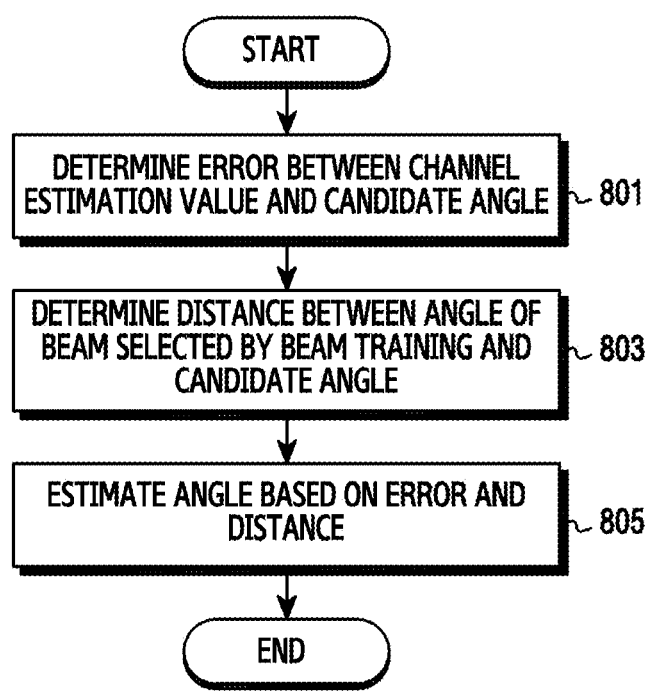
FIG. 8 is a flowchart illustrating an operating procedure of the electronic device according to the present disclosure.

FIG. 8 is a flowchart illustrating an operating procedure of the electronic device according to the present disclosure. FIG. 8 illustrates an operating method of the device A 110.

Referring to FIG. 8, in step 801, the device A 110 determines errors between channel measurement values and candidate angles. The channel measurement values include channel measurement values according to the beams, and each of the candidate angles includes a combination of the channel measurement values. The errors can be MSE. For example, the device A 110 can calculate the errors by Equation 1 above. Namely, the device A 110 can scale a combination of channel values of each candidate angle according to the distance from a counterpart device, and can determine the errors between the channel measurement values and the combinations of channel values of the respective candidate angles. In this case, the device A 110 can calculate an error for one candidate angle by calculating the errors of the channel measurement values, according to the beams, and then adding up the errors or weighting values for one candidate angle.

Next, the device A 110 proceeds to step 803 to determine the distance between the angle of a beam selected by beam training and at least one candidate angle. According to various embodiments of the present disclosure, the device A 110 can determine the distances from all the candidate angles or the distances from some candidate angles. For example, the device A 110 can determine the distances between a predefined number of candidate angles having small errors and the angle of the beam selected by the beam training. To this end, the device A 110 converts the index of the beam selected by the beam training into an angle and calculates the distance between the angle and at least one candidate angle. In this case, the distance can include at least one of a Manhattan distance, a Euclidean distance, and a Hamming distance.

Then, the device A 110 proceeds to step 805 to estimate an angle for the counterpart device based on the errors and the distances. For example, the device A 110 can determine a determination index of each candidate angle based on the error and distance for the candidate angle and can select one candidate angle having an index that conforms to a predetermined reference. For example, the determination index can be defined as the weighted sum of the error and the distance. In this case, the device A 110 can determine the candidate angle having the smallest weighted sum to be an angle for the counterpart device. For example, the device A 110 can calculate the weighted sum by Equation 2 above.

Figure 9:
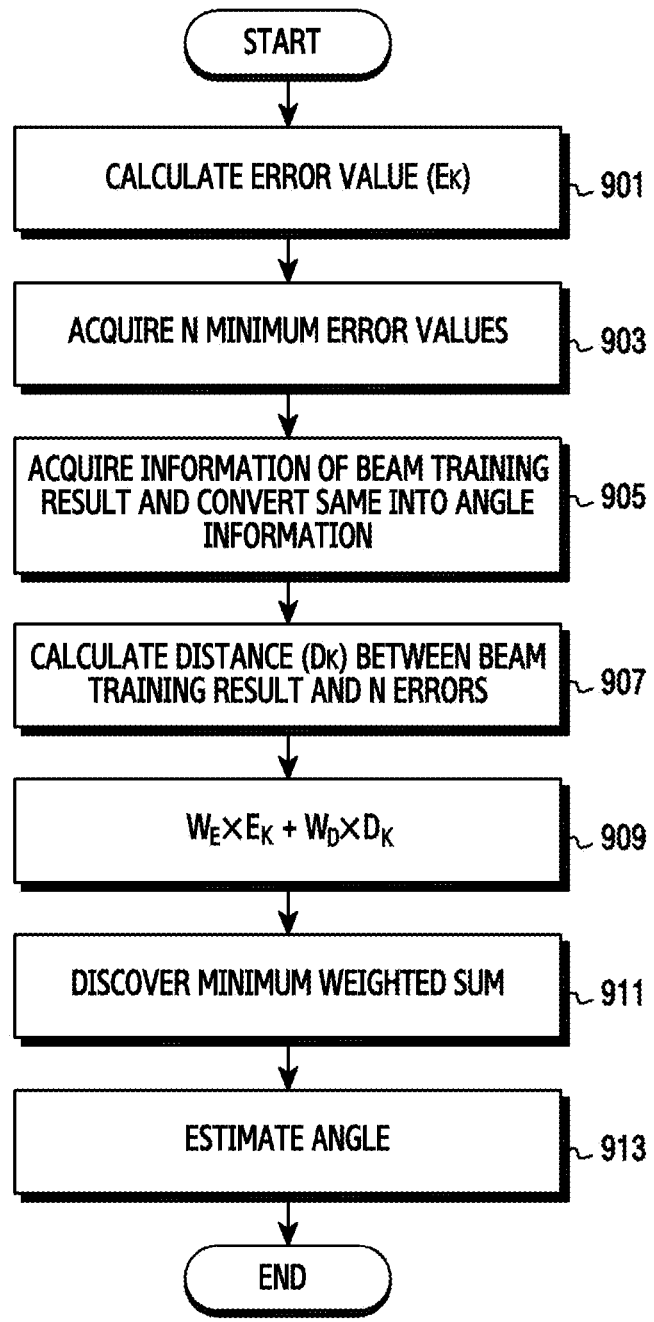
FIG. 9 is a flowchart illustrating an angle estimation procedure in the electronic device according to the present disclosure.

FIG. 9 is a flowchart illustrating an angle estimation procedure in the electronic device according to the present disclosure. FIG. 9 illustrates an angle estimation method of the device A 110.

Referring to FIG. 9, in step 901, the device A 110 calculates an error value. To this end, the device A 110 acquires channel measurement values by estimating channels according to beams for a counterpart device. Further, the device A 110 determines error values between the channel measurement values and a plurality of candidate angles. The errors can be MSE. For example, the device A 110 can calculate the errors by Equation 1 above. Namely, the device A 110 can scale a combination of channel values of each candidate angle according to the distance from the counterpart device, and can determine the errors between the channel measurement values and the combinations of channel values of the respective candidate angles. In this case, the device A 110 can calculate an error for one candidate angle by calculating the errors of the channel measurement values according to the beams and then adding up the errors or weighting values for one candidate angle.

Next, the device A 110 proceeds to step 903 to acquire N minimum error values. According to various embodiments of the present disclosure, N is equal to, or less than, the number of all candidate angles. N is a preset value and can be set differently according to specific embodiments. Namely, the device A 110 can arrange the candidate angles in an ascending order of the error value and can select N candidate angles and N error values.

Then, the device A 110 proceeds to step 905 to acquire information of beam training result and convert the beam information into angle information. Namely, the device A 110 can determine an optimal beam, or an optimal beam pair, by performing beam training together with the counterpart device. The beam training can be performed before or after this procedure. For example, when the device A 110 wants to estimate an angle while communicating with the counterpart device, the optimal beam can be determined through the beam training performed before the start of this procedure. However, in cases where the optimal beam is not determined, the device A 110 can determine the angle information after performing beam training together with the counterpart device. For example, the device A 110 can perform the beam training as in FIG. 4 or 5.

Subsequently, the device A 110 proceeds to step 907 to calculate the distance between the beam training result and N error points. In other words, the device A 110 determines the distances between the angle of a beam selected by the beam training and the N candidate angles. Each distance corresponds to D2 of FIG. 2. The distance can include at least one of a Manhattan distance, a Euclidean distance, and a Hamming distance.

Then, the device A 110 proceeds to step 909 to calculate the weighted sums of the error values for the N candidate angles and the distances. Accordingly, N weighted sums are calculated. Weighting values are applied to the error values and the distances, respectively, and the weighting values for the error values can be equal to, or different from, the weighting values for the distances. The weighting values can be adjusted by an adaptation function. The process of adjusting the weighting values will be described below with reference to FIG. 10.

After calculating the weighted sums, the device A 110 proceeds to step 911 to discover the smallest weighted sum. Namely, the device A 110 determines the smallest of the N weighted sums calculated in step 909.

Thereafter, the device A 110 proceeds to step 913 to estimate an angle. The device A 110 can determine the candidate angle having the smallest weighted sum to be an angle for the counterpart device. Namely, the device A 110 identifies the candidate angle having the smallest weighted sum and identifies an angle value corresponding to the candidate angle.

Figure 10:
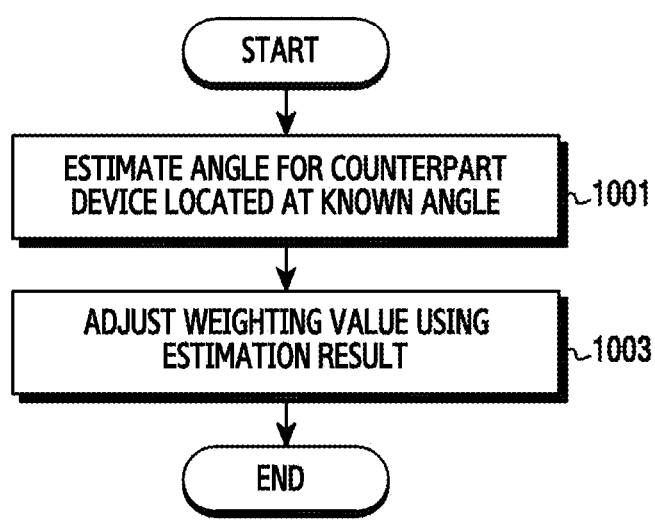
FIG. 10 is a flowchart illustrating a weighting value adjustment procedure of the electronic device according to the present disclosure.

FIG. 10 is a flowchart illustrating a weighting value adjustment procedure of the electronic device according to the present disclosure. FIG. 10 illustrates a weighting value adjustment method of the device A 110.

Referring to FIG. 10, in step 1001, the device A 110 estimates an angle for a counterpart device located at a known angle. Specifically, the device A 110 can determine channel measurement values according to beams for the counterpart device, determine errors between the channel measurement values and combinations of channel values of a plurality of candidate angles, and estimate the angle based on the errors and the angle of a beam determined by beam training. For example, the device A 110 can estimate the angle by performing the procedure illustrated in FIG. 8.

Next, the device A 110 proceeds to step 1003 to adjust weighting values using the estimation result. Namely, using the angle for the counterpart device that has been estimated in step 1001, the device A 110 can adjust weighting values that are applied to the errors and the angle of the beam determined by the beam training. Since the actual angle for the counterpart device has been known, the device A 110 can determine the accuracy of the estimation result. Accordingly, based on the accuracy of the estimation result, the device A 110 can adjust the weighting values in order to reduce an estimated error.

The procedure illustrated in FIG. 10 can be performed when there is a counterpart device located at a known angle. The procedure illustrated in FIG. 10 can be performed in an operation mode for adjusting a weighting value. For example, the operation mode can be referred to as a calibration mode. Specifically, the device A 110 can request a user to locate the counterpart device at a specific angle, and can therefore determine the actual angle for the counterpart device. Here, the request to the user can be performed through notification message display, audio output, and the like.

Figure 11:
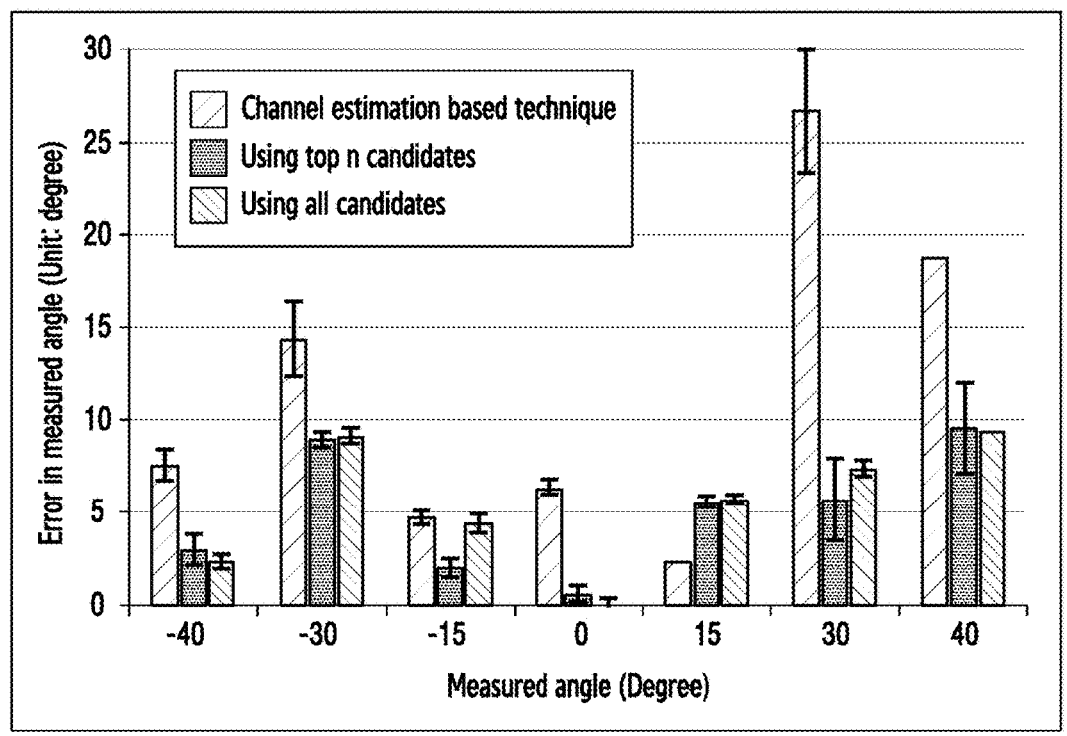
FIG. 11 illustrates an experimental result for performance comparison according to the present disclosure.

FIG. 11 illustrates an experimental result for performance comparison according to the present disclosure. FIG. 11 illustrates a performance comparison between a case of using channel measurement values only, a case of reflecting a beam training result using N candidate angles that have a small error from an angle estimated based on channel estimation, and a case of reflecting a beam training result using all candidate angles. FIG. 11 shows an experimental result in cases where the distance between devices is 1 meter. In FIG. 11, the horizontal axis represents actual angles for a counterpart device, and the vertical axis represents measured errors. Referring to FIG. 11, an error is smaller when a beam training result is reflected than when only the channel measurement values are used. In particular, a great improvement in performance is exhibited when the counterpart device is located around 30°. Namely, in the case of reflecting a beam training result, an estimation error decreases, and a measurable coverage increases.

Figure 12:
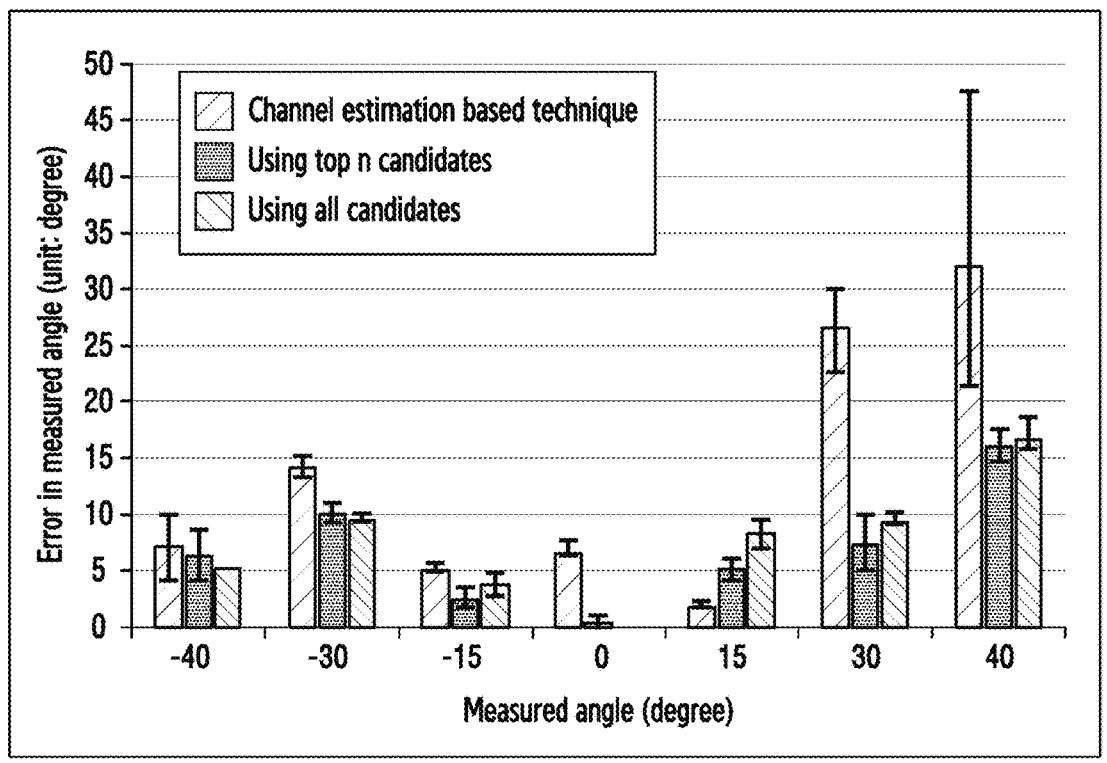
FIG. 12 illustrates another experimental result for performance comparison according to the present disclosure.

FIG. 12 illustrates another experimental result for performance comparison according to the present disclosure. FIG. 12 illustrates a performance comparison between a case of using channel measurement values only, a case of reflecting a beam training result using N candidate angles that have a small error from an angle estimated based on channel estimation, and a case of reflecting a beam training result using all candidate angles. FIG. 12 shows an experimental result in cases where the distance between devices is 2 meters. In FIG. 12, the horizontal axis represents actual angles for a counterpart device, and the vertical axis represents measured errors. Referring to FIG. 12, an error is smaller when a beam training result is reflected than when only the channel measurement values are used. In particular, a great improvement in performance is exhibited when the counterpart device is located around 40°. Namely, in the case of reflecting a beam training result, an outlier filtering effect, that is, an error filtering effect is obtained.

Through the above described procedure, an electronic device can estimate an angle for another electronic device. The estimated angle value can be used in a variety of manners. For example, according to an embodiment of the present disclosure, the angle value can be used by a content sharing application. Specifically, using angles for a neighboring device, the electronic device (e.g., the device A 110) can provide a User Interface (UI)/User Experience (UX) for content sharing. Hereinafter, embodiments for using an estimated angle for content sharing will be described below.

Figure 13:
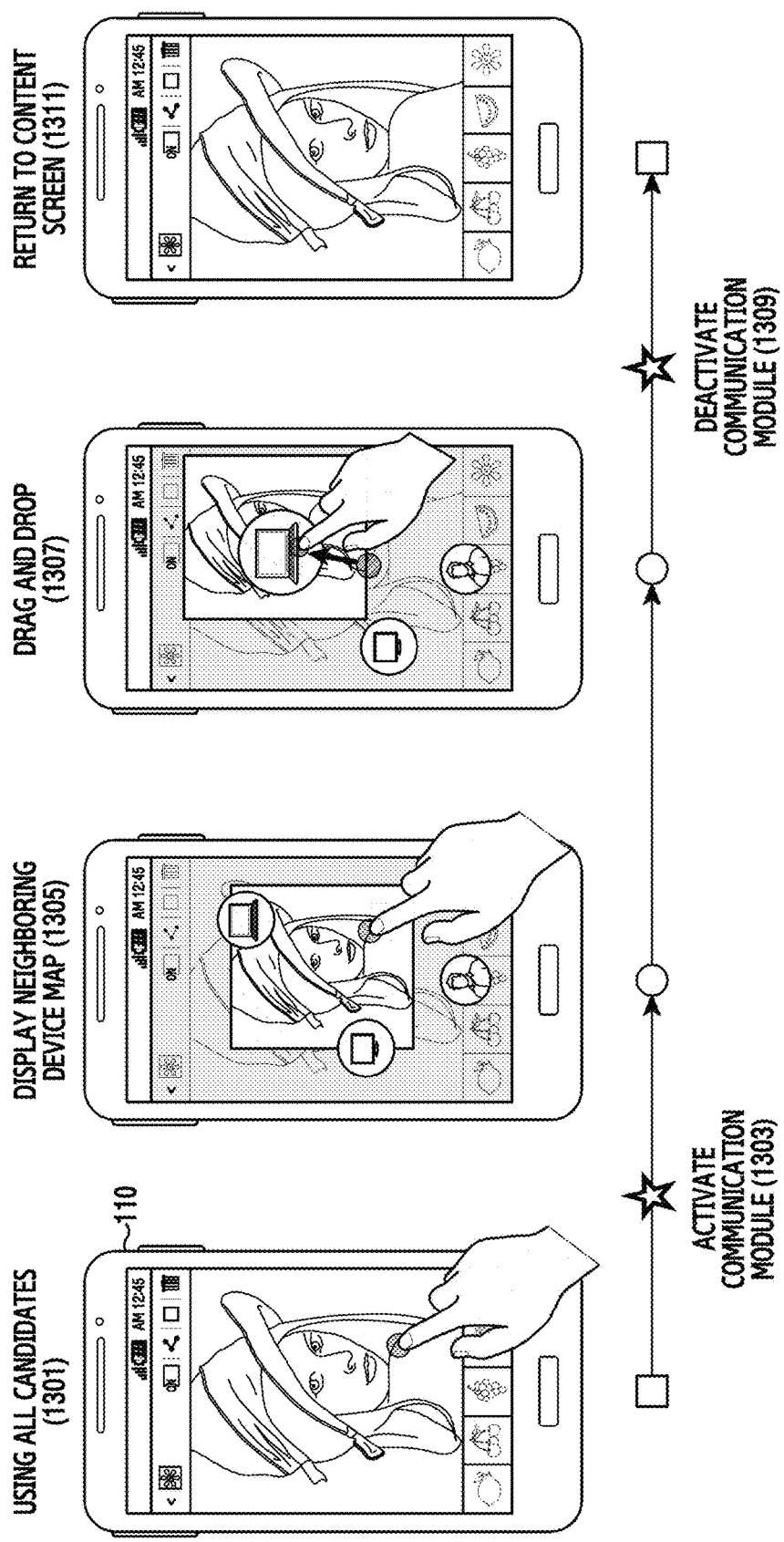
FIG. 13 illustrates an example of an interface for content sharing of a content priority selection type in an electronic device according to the present disclosure.

FIG. 13 illustrates an example of a content sharing interface of a content priority selection type in an electronic device according to the present disclosure. FIG. 13 illustrates interfaces displayed on the device A 110 while sharing content.

Referring to FIG. 13, in step 1301, a command to share content is recognized. Namely, the device A 110 displays content (e.g., a photograph) and detects a pre-defined user input to recognize the command to share the content. For example, the pre-defined user input can be defined as a long press for a predetermined period of time or more at a fixed point. The long press can be referred to as a 'tap-hold.'

After the command to share the content is recognized, a communication module (e.g., the communication unit 710) of the device A 110 is activated in step 1303. The communication module is activated in order to estimate an angle for at least one neighboring device. Namely, the device A 110 estimates an angle for at least one neighboring device.

After the communication module is activated, a neighboring device map is displayed in step 1305. Furthermore, the thumbnail of the content is displayed. The neighboring device map includes items that represent one or more neighboring devices. The items are interface elements that can be selected by a user, and can have the format of an 'icon.' Each item represents one neighboring device. Furthermore, each item can represent the type of corresponding neighboring device or identification information of the owner of the neighboring device. Here, the type or the identification information can be represented by a graphic, an image, a text, a number, or a combination thereof. According to the present disclosure, the items are displayed in positions corresponding to angles estimated by the device A 110 with respect to the thumbnail. FIG. 13 illustrates a case in which two items are displayed.

After the neighboring device map is displayed, the thumbnail is dragged and dropped by the user in step 1307. The drag and drop is defined as a command to select a target with which the content is to be shared. Namely, the user drags and drops the thumbnail to one of the items included in the neighboring device map, and the device A 110 determines the neighboring device indicated by the item corresponding to the drop location to be a target with which the content is to be shared.

Thereafter, in step 1309, the communication module (e.g., the communication unit (or transceiver) 710) is deactivated. Namely, although not illustrated in FIG. 13, the device A 110 transmits the content to the neighboring device indicated by the item corresponding to the drop location and deactivates the communication module.

After the communication module is deactivated, the content screen returns in step 1311. In other words, the device A 110 returns to the state prior to the command to share the content in step 1301. Namely, the screen for displaying the shared content is displayed again.

Figure 14:
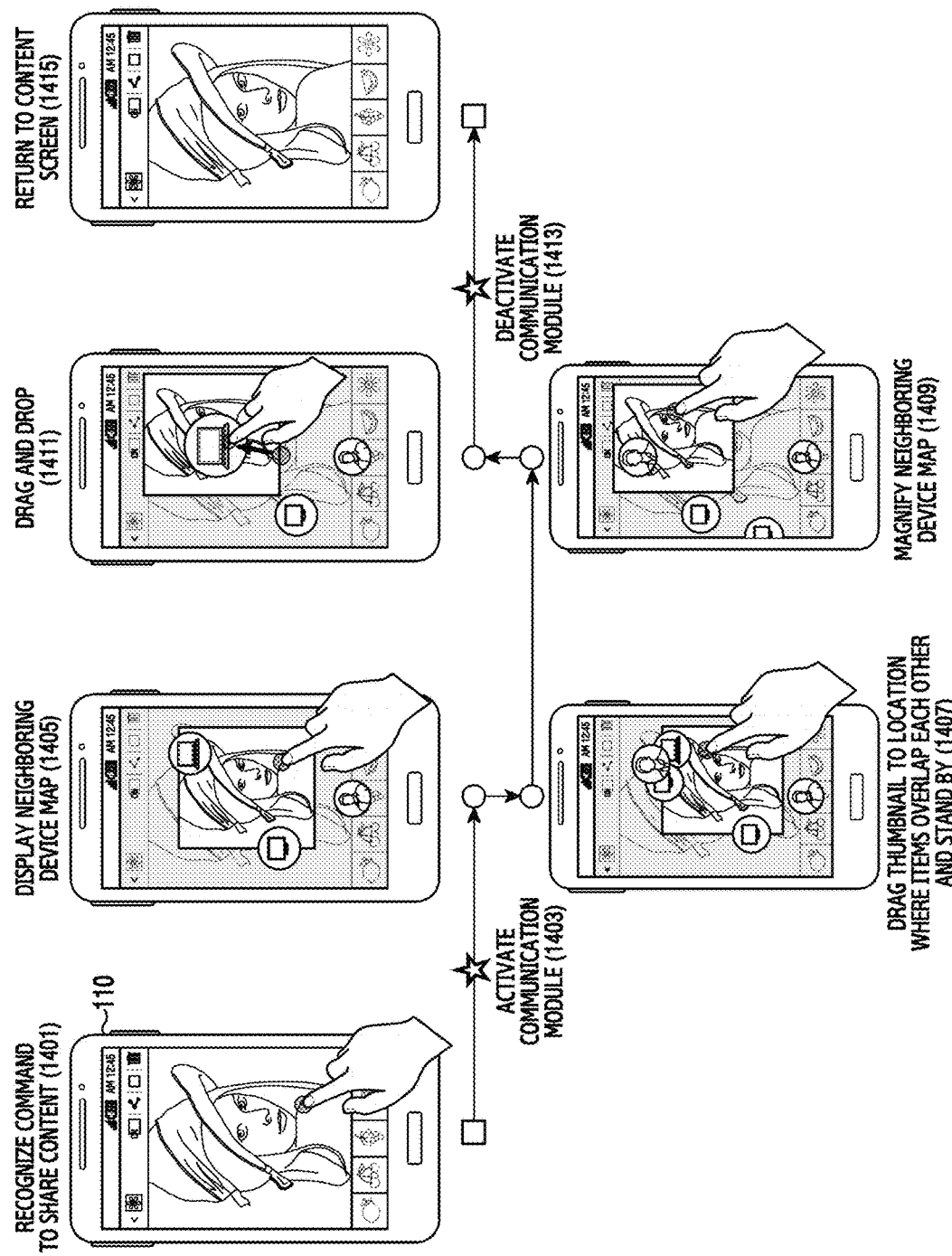
FIG. 14 illustrates another example of an interface for content sharing of a content priority selection type in an electronic device according to the present disclosure.

FIG. 14 illustrates another example of a content sharing interface of a content priority selection type in an electronic device according to the present disclosure. FIG. 14 illustrates interfaces displayed on the device A 110 while sharing content.

Referring to FIG. 14, a command to share content is recognized in step 1401. Namely, the device A 110 displays content (e.g., a photograph) and detects a pre-defined user input to recognize the command to share the content. For example, the pre-defined user input can be defined as a long press for a predetermined period of time or more at a fixed point.

After the command to share the content is recognized, a communication module (e.g., the communication unit 710) of the device A 110 is activated in step 1403. The communication module is activated in order to estimate an angle for at least one neighboring device. Namely, the device A 110 estimates an angle for at least one neighboring device.

After the communication module is activated, a neighboring device map is displayed in step 1405. Further, the thumbnail of the content is displayed. The neighboring device map includes items that represent one or more neighboring devices. The items are interface elements that can be selected by a user, and can have the format of an 'icon', Each item represents one neighboring device. Furthermore, each item can represent the type of corresponding neighboring device or identification information of the owner of the neighboring device. Here, the type or the identification information can be represented by a graphic, an image, a text, a number, or a combination thereof. According to the present disclosure, the items are displayed in positions corresponding to angles estimated by the device A 110 with respect to the thumbnail. FIG. 14 illustrates a screen on which four items are displayed, three of which are displayed while overlapping each other.

After the neighboring device map is displayed, the thumbnail is dragged to the location where the plurality of items overlap each other, and then is maintained for a predetermined period of time in step 1407. Namely, a user drags the thumbnail to the region in which the plurality of items overlap each other and stands by for a predetermined period of time. In other words, a hold is maintained for a predetermined period of time after the drag. In cases where the plurality of items overlap each other, or are displayed close to each other, it can be difficult to determine which item is selected when the selection is made by means of the drag of the thumbnail. In this case, an unintended item, namely, a different neighboring device can be selected. Accordingly, a function for more clearly displaying the location relation between the items is provided, and the drag and standby of the thumbnail is defined as a command to magnify the neighboring device map.

When the thumbnail is dragged to the location where the plurality of items overlap each other, the neighboring device map is magnified in step 1411. In the example of FIG. 14, the sizes of the items are maintained, and the intervals between the items are enlarged. According to another embodiment of the present disclosure, the sizes of the items can also become larger. Accordingly, the user can more clearly distinguish between the items that overlap each other, or are close to each other.

After the neighboring device map is magnified, the thumbnail is dragged and dropped by the user in step 1411. The drag and drop is defined as a command to select a target with which the content is to be shared. Namely, the user drags and drops the thumbnail to one of the items included in the neighboring device map, and the device A 110 determines the neighboring device indicated by the item corresponding to the drop location to be a target with which the content is to be shared.

Thereafter, in step 1413, the communication module (e.g., the communication unit 710) is deactivated. Namely, although not illustrated in FIG. 14, the device A 110 transmits the content to the neighboring device indicated by the item corresponding to the drop location and deactivates the communication module.

After the communication module is deactivated, the content screen returns in step 1415. In other words, the device A 110 returns to the state prior to the command to share the content in step 1401. Namely, the screen for displaying the shared content is displayed again.

Figure 15:
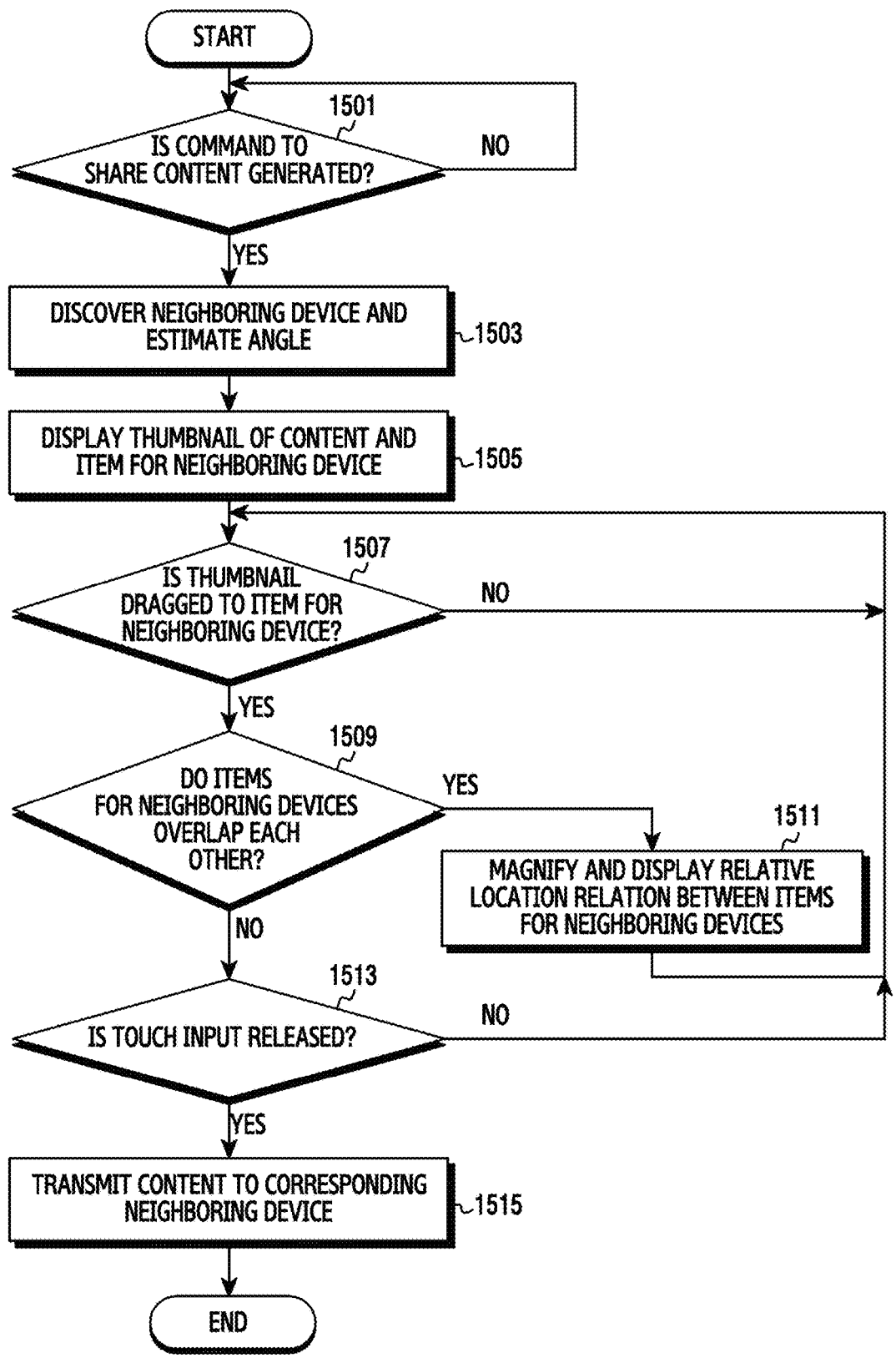
FIG. 15 is a flowchart illustrating a content sharing procedure of a content priority selection type of an electronic device according to the present disclosure.

FIG. 15 is a flowchart illustrating a content sharing procedure of a content priority selection type of an electronic device according to the present disclosure. FIG. 15 illustrates an operating method of the device A 110 for providing an interface as illustrated in FIGS. 13 and 14.

Referring to FIG. 15, in step 1501, the device A 110 determines whether a command to share content is generated. The device A 110 can display content (e.g., a photograph, a video, and the like.) and can detect a pre-defined user input to recognize the command to share the content. For example, the pre-defined user input can be defined as a long press for a predetermined period of time or more at a fixed point.

When the command to share the content is generated, the device A 110 proceeds to step 1503 to discover at least one neighboring device and estimate an angle for the at least one neighboring device. To this end, the device A 110 can transmit and receive a signal for the discovery. Furthermore, for the estimation of the angle, the device A 110 can estimate channel values according to beams, calculate errors between the channel values and combinations of channel values of a plurality of candidate angles, and estimate an angle based on the angle of a beam determined through beam training and the errors. For example, the device A 110 can estimate the angle as illustrated in FIG. 10 or 11.

Next, the device A 110 proceeds to step 1505 to display the thumbnail of the content and at least one item for representing the at least one neighboring device. Here, the at least one item is displayed according to the angle. Specifically, the at least one item is displayed in a position corresponding to the angle with respect to the thumbnail. The item can represent the type of corresponding neighboring device or identification information of the owner of the neighboring device. For example, the thumbnail and the at least one item can be displayed as in step 1305 of FIG. 13.

Thereafter, the device A 110 proceeds to step 1507 to determine whether the thumbnail is dragged to one item. Namely, a user can drag the thumbnail to move the thumbnail within the screen, and the device A 110 determines whether the thumbnail moves to one item. The drag to the item can be determined by a tap on the thumbnail and whether a predetermined region around the tap point makes contact with the item.

When the thumbnail is dragged to the item, the device A 110 proceeds to step 1509 to determine whether the item overlaps with at least one other item. Here, the overlapping means that two or more items are disposed at an interval smaller than, or equal to, a threshold value.

When the items overlap each other, the device A 110 proceeds to step 1511 to magnify the relative location relation between the items. In cases where a plurality of items overlap each other, it can be difficult to determine which item is selected. Accordingly, the device A 110 can enlarge the interval between the items such that the items are displayed to be more easily distinguished from each other. However, in order to more clearly determine the intention of the enlargement, the device A 110 can enlarge the relative location relation when a hold is maintained for a predetermined period of time after the drag. Thereafter, the device A 110 returns to step 1507.

When the items do not overlap each other, the device A 110 proceeds to step 1513 to determine whether the touch input is released. Namely, while the thumbnail is dragged to one item, the device A 110 identifies whether the touch input is released. In other words, the device A 110 determines whether a drag and drop is generated for the item. When the touch input is not released, namely, when the touch input is maintained, the device A 110 returns to step 1507.

When the touch input is released, the device A 110 proceeds to step 1515 to transmit the selected content to the neighboring device indicated by the item. Since the beam training has been performed for the angle estimation in step 1503, the device A 110 can transmit the content using a transmission beam determined in step 1503. However, according to another embodiment of the present disclosure, the device A 110 can perform the beam training again and can transmit the content.

Figure 16:
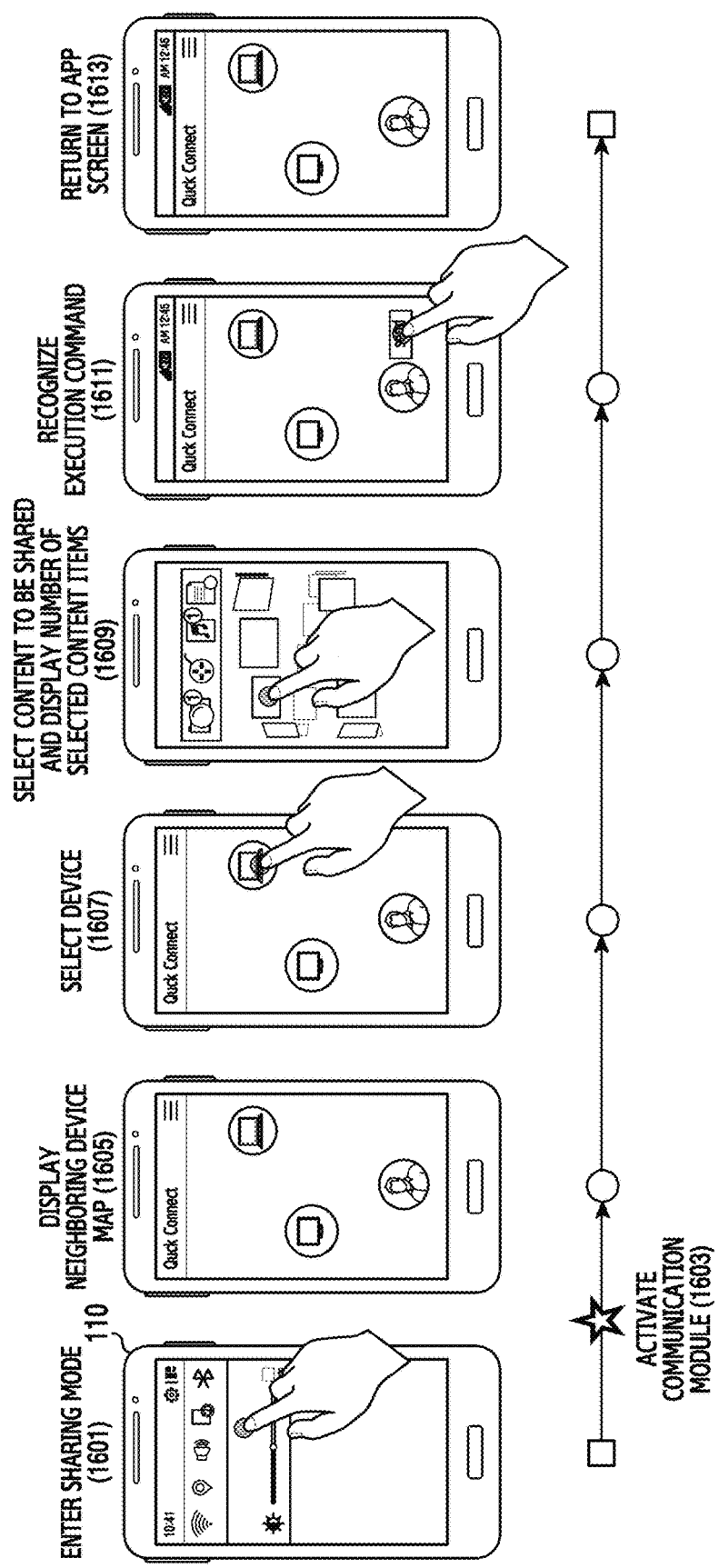
FIG. 16 illustrates an example of an interface for content sharing of a user priority selection type in an electronic device according to the present disclosure.

FIG. 16 illustrates an example of an interface for content sharing of a user priority selection type in an electronic device according to the present disclosure. FIG. 16 illustrates interfaces displayed on the device A 110 while sharing content.

Referring to FIG. 16, in step 1601, the device A 110 enters a sharing mode. In other words, the device A 110 executes an application for sharing content. The device A 110 enters the sharing mode by detecting a user input defined by a command of the sharing mode. For example, the user input can include a selection on a menu screen.

After the device A 110 enters the sharing mode, a communication module (e.g., the communication unit 710) of the device A 110 is activated in step 1603. The communication module is activated in order to estimate an angle for at least one neighboring device. Namely, the device A 110 estimates an angle for at least one neighboring device.

After the communication module is activated, a neighboring device map is displayed in step 1605. The neighboring device map includes items that represent one or more neighboring devices. The items are interface elements that can be selected by a user, and can have the format of an 'icon.' Each item represents one neighboring device. Furthermore, each item can represent the type of corresponding neighboring device or identification information of the owner of the neighboring device. Here, the type or the identification information can be represented by a graphic, an image, a text, a number, or a combination thereof. According to the present disclosure, the items are displayed in positions corresponding to angles estimated by the device A 110. FIG. 16 illustrates a screen on which two items are displayed.

After the neighboring device map is displayed, one neighboring device is selected in step 1607. The user can select the neighboring device with which content is to be shared by selecting one of the items. The selection can be detected by a touch input (e.g., tap) on the item.

After the neighboring device is selected, content to be shared is selected and the number of selected content items is displayed in step 1609. Namely, a neighboring device with which content is to be shared is specified by selecting the neighboring device, and the device A 110 displays a screen for selecting content. Further, the user selects content to be shared, that is, at least one file. Accordingly, the device A 110 displays the number of selected files. In this case, the number of files can be separately displayed according to the type of content. For example, the type of content can be represented by an indicator for representing the type of content, and the number of corresponding files can be represented by a number. In the example of FIG. 16, the fact that three pieces of photograph content and one piece of music content have been selected is displayed on the upper end of the screen.

After the content to be shared is selected, an execution command for a sharing procedure is recognized in step 1611. The device A 110 enters the sharing mode by detecting a user input defined by the execution of the sharing procedure. For example, the user input can include a selection of a button that is configured for the execution command. For example, after the content is selected, the device A 110 can display the neighboring device map again, and the user can select the button that is included in the screen for displaying the neighboring device map. In the example of FIG. 16, the button configured for the execution is not included in the first neighboring device map, but is included after the selection of the content. However, according to another embodiment of the present disclosure, the button can also be included in the screen for displaying the neighboring device map before the selection of the content. In the example of FIG. 16, the button configured for the execution is included in the screen for displaying the neighboring device map. However, according to another embodiment of the present disclosure, the button configured for the execution can be included in a screen for displaying the sharable content. In this case, the user can instruct the execution of the sharing procedure without switching a screen after the selection of the content.

Thereafter, in step 1613, the neighboring device map returns. In other words, the device A 110 transmits the selected content to the selected neighboring device and displays the screen displayed in step 1605 again. In the example of FIG. 16, the button configured for the execution is removed after the transmission of the content. However, according to another embodiment of the present disclosure, the button can also be included in the screen for displaying the neighboring device map after the transmission of the content.

Figure 17:
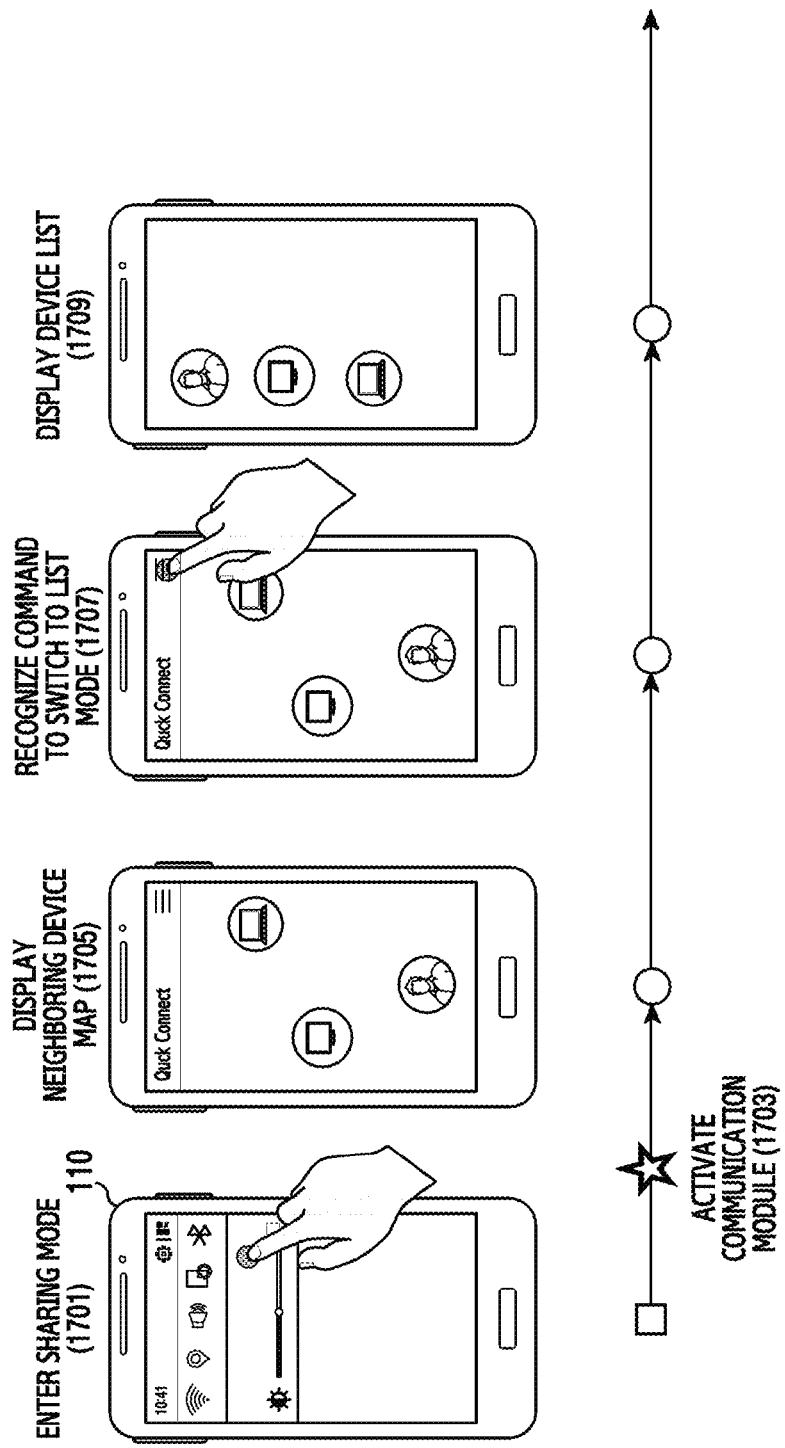
FIG. 17 illustrates another example of an interface for content sharing of a user priority selection type in an electronic device according to the present disclosure.

FIG. 17 illustrates another example of an interface for content sharing of a user priority selection type in an electronic device according to the present disclosure. FIG. 17 illustrates interfaces displayed on the device A 110 while sharing content.

Referring to FIG. 17, the device A 110 enters a sharing mode in step 1701. In other words, the device A 110 executes an application for sharing content. Namely, the device A 110 enters the sharing mode by detecting a user input defined by a command of the sharing mode. For example, the user input can include a selection on a menu screen.

After the device A 110 enters the sharing mode, a communication module (e.g., the communication unit 710) of the device A 110 is activated in step 1703. The communication module is activated in order to estimate an angle for at least one neighboring device. Namely, the device A 110 estimates an angle for at least one neighboring device.

After the communication module is activated, a neighboring device map is displayed in step 1705. The neighboring device map includes items that represent one or more neighboring devices. The items are interface elements that can be selected by a user, and can have the format of an 'icon.' Each item represents one neighboring device. Furthermore, each item can represent the type of corresponding neighboring device or identification information of the owner of the neighboring device. Here, the type or the identification information can be represented by a graphic, an image, a text, a number, or a combination thereof. According to the present disclosure, the items are displayed in positions corresponding to angles estimated by the device A 110. FIG. 17 illustrates a screen on which two items are displayed.

After the neighboring device map is displayed, a command to switch to a list mode is recognized in step 1707. Namely, the device A 110 detects a user input defined by the command to switch to the list mode. For example, the user input can include a selection of a button that is configured to display a list. In the example of FIG. 17, the button is disposed on the upper right end of the screen for displaying the neighboring device map.

After the command to switch to the list mode is recognized, a list of neighboring devices is displayed in step 1709. Namely, the device A 110 arranges the items of the discovered neighboring devices without consideration of angles for the neighboring devices. Here, the items can be configured by a graphic, an image, a text, etc. that represent the type of devices. The items can be arranged in order by a distance or type.

Figure 18:
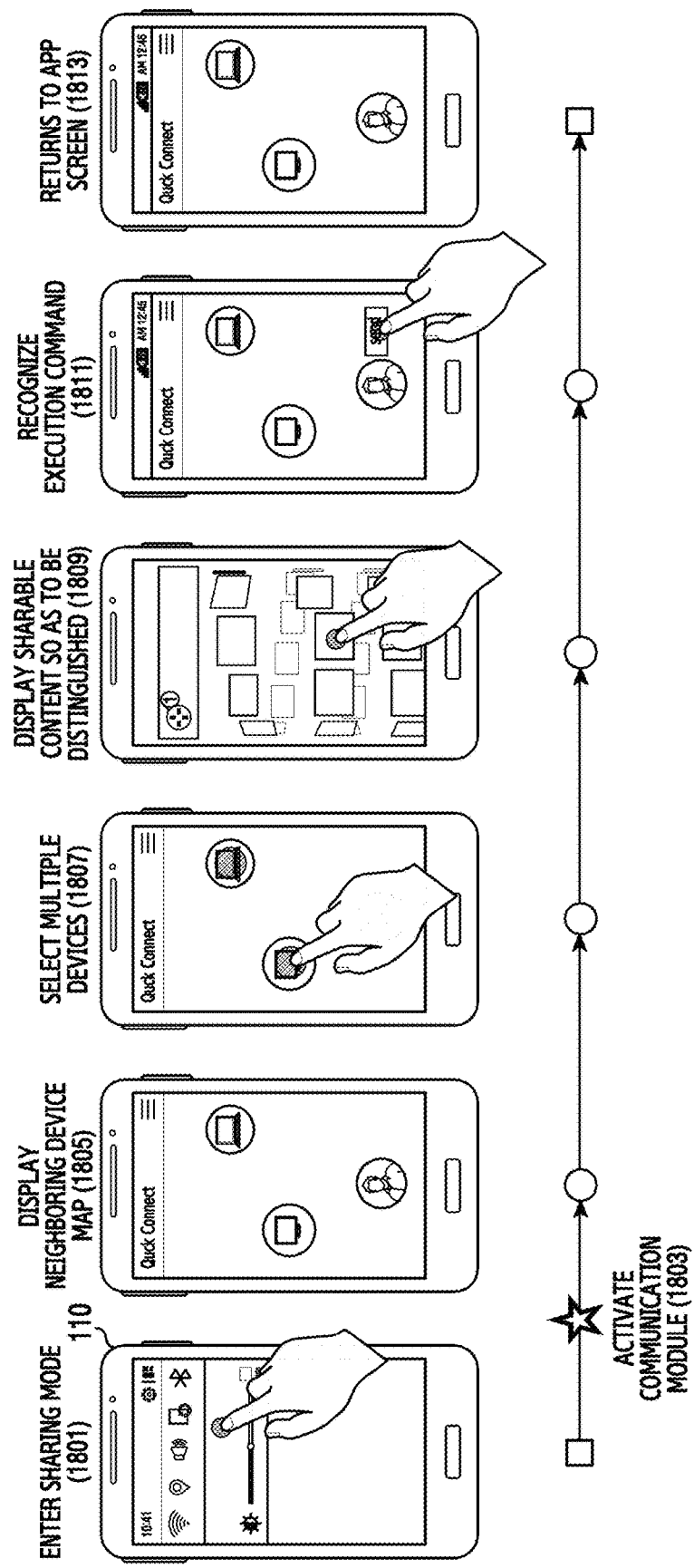
FIG. 18 illustrates yet another example of an interface for content sharing of a user priority selection type in an electronic device according to the present disclosure.

FIG. 18 illustrates yet another example of an interface for content sharing of a user priority selection type in an electronic device according to the present disclosure. FIG. 18 illustrates interfaces displayed on the device A 110 while sharing content.

Referring to FIG. 18, the device A 110 enters a sharing mode in step 1801. Namely, the device A 110 enters the sharing mode by detecting a user input defined by a command of the sharing mode. For example, the user input can include a selection on a menu screen.

After the device A 110 enters the sharing mode, a communication module (e.g., the communication unit 710) of the device A 110 is activated in step 1803. The communication module is activated in order to estimate an angle for at least one neighboring device. Namely, the device A 110 estimates an angle for at least one neighboring device.

After the communication module is activated, a neighboring device map is displayed in step 1805. The neighboring device map includes items that represent one or more neighboring devices. The items are interface elements that can be selected by a user, and can have the format of an 'icon.' Each item represents one neighboring device. Furthermore, each item can represent the type of corresponding neighboring device or identification information of the owner of the neighboring device. Here, the type or the identification information can be represented by a graphic, an image, a text, a number, or a combination thereof. According to the present disclosure, the items are displayed in positions corresponding to angles estimated by the device A 110. FIG. 18 illustrates a screen on which two items are displayed.

After the neighboring device map is displayed, a plurality of neighboring device are selected in step 1807. The user can select the plurality of neighboring device with which content is to be shared by selecting two or more of the items. The selection can be detected by a plurality of touch inputs (e.g., taps).

After the neighboring devices are selected, content to be shared is selected and the number of selected content items is displayed in step 1809. Neighboring devices with which content is to be shared are specified by selecting the neighboring devices, and the device A 110 displays a screen for selecting content, namely, files. In this case, some of the files may not be suitable to be shared by the selected neighboring devices. For example, the corresponding file may not be suitable to be shared by the selected neighboring devices in cases where some of the selected neighboring devices: do not support a corresponding compression format; do not support a corresponding codec; may not execute or reproduce a corresponding file; or may not receive data having a predetermined size or more. In this case, the device A 110 can perform a display such that files that can be shared by all the selected neighboring devices are distinguished from at least one remaining file. For example, at least one file that is unsuitable for sharing can be: shaded or blurred; set so as to not be selected; not displayed; or displayed together with an indicator for notifying that the file is not suitable to be shared. Furthermore, the device A 110 displays the number of selected files. In this case, the number of files can be separately displayed according to the type of content. For example, the type of content can be represented by an indicator for representing the type of content, and the number of corresponding files can be represented by a number. In the example of FIG. 18, the fact that one video has been selected is displayed on the upper end of the screen.

After the content to be shared is selected, an execution command for a sharing procedure is recognized in step 1811. The device A 110 enters the sharing mode by detecting a user input defined by the execution of the sharing procedure. For example, the user input can include the selection of a button that is configured for the execution command. For example, after the content is selected, the device A 110 can display the neighboring device map again, and the user can select the button that is included in the screen for displaying the neighboring device map. In the example of FIG. 18, the button configured for the execution is not included in the first neighboring device map, but is included after the selection of the content. However, according to another embodiment of the present disclosure, the button can also be included in the screen for displaying the neighboring device map before the selection of the content. In the example of FIG. 18, the button configured for the execution is included in the screen for displaying the neighboring device map. However, according to another embodiment of the present disclosure, the button configured for the execution can be included in a screen for displaying the sharable content. In this case, the user can instruct the execution of the sharing procedure without switching a screen after the selection of the content.

Thereafter, in step 1813, the neighboring device map returns. In other words, the device A 110 transmits the selected content to the selected neighboring devices and displays the screen displayed in step 1805 again. In the example of FIG. 18, the button configured for the execution is removed after the transmission of the content. However, according to another embodiment of the present disclosure, the button can also be included in the screen for displaying the neighboring device map after the transmission of the content.

Figure 19:
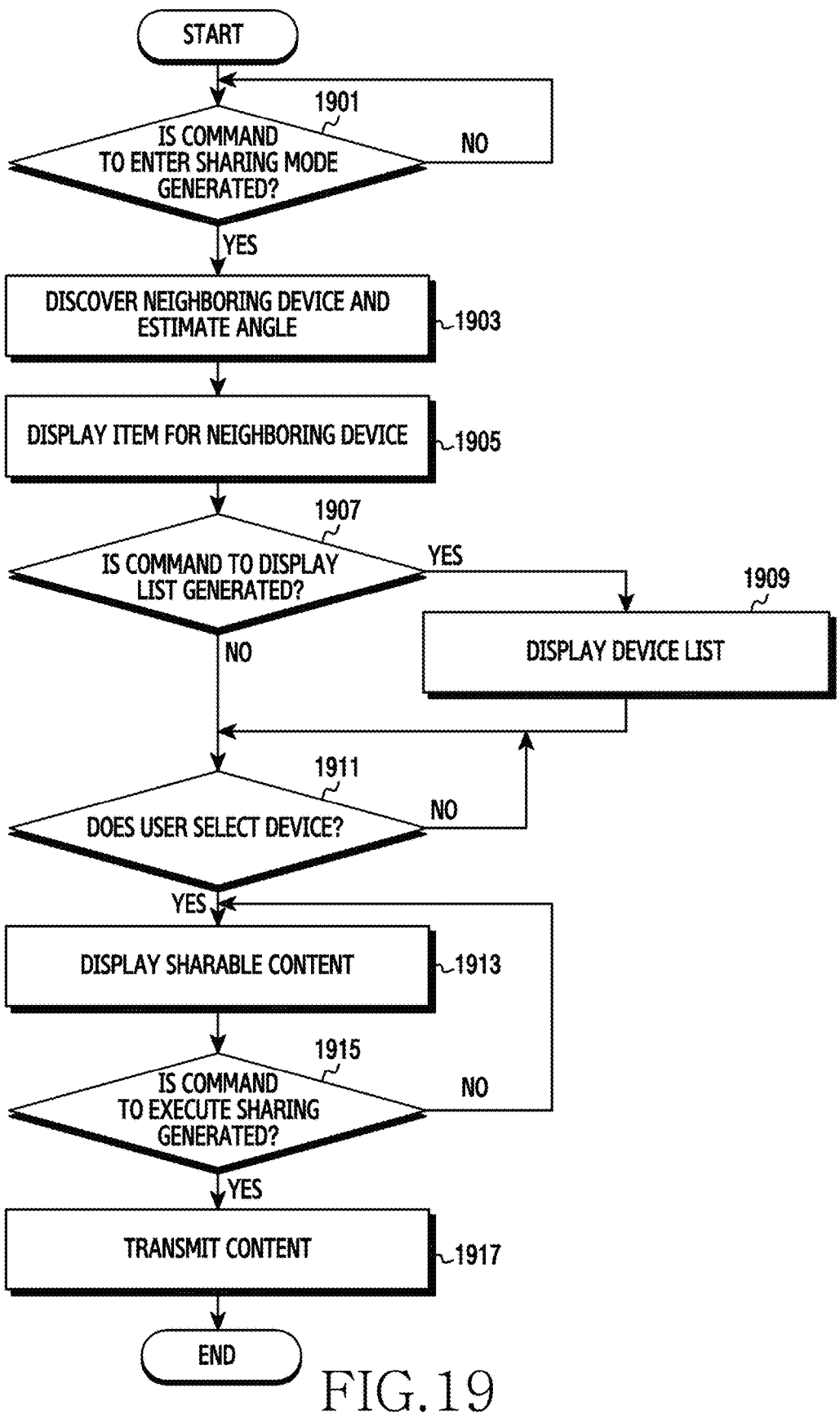
FIG. 19 is a flowchart illustrating a content sharing procedure of a user priority selection type of an electronic device according to the present disclosure.

FIG. 19 is a flowchart illustrating a content sharing procedure of a user priority selection type of an electronic device according to the present disclosure. FIG. 15 illustrates an operating method of the device A 110 for providing an interface as illustrated in FIGS. 16, 17, and 18.

Referring to FIG. 19, the device A 110 determines whether a command to enter a sharing mode is generated. Namely, the device A 110 determines whether an application for content sharing is instructed to be executed. In other words, the device A 110 determines whether a user selects the sharing mode on a menu screen.

When the command to enter the sharing mode is generated, the device A 110 proceeds to step 1903 to discover at least one neighboring device and estimate an angle for the at least one neighboring device. To this end, the device A 110 can transmit and receive a signal for the discovery. Furthermore, for the estimation of the angle, the device A 110 can: estimate channel values according to beams; calculate errors between the channel values and combinations of channel values of a plurality of candidate angles; and estimate an angle based on the angle of a beam determined through beam training and the errors. For example, the device A 110 can estimate the angle as illustrated in FIG. 10 or 11.

Next, the device A 110 proceeds to step 1905 to display the thumbnail of content and at least one item for representing the at least one neighboring device. Here, the at least one item is displayed according to the angle. Specifically, the at least one item is displayed in a position corresponding to the angle. The item can represent the type of corresponding neighboring device or identification information of the owner of the neighboring device. For example, the at least one item can be displayed as in step 1605 of FIG. 16.

Thereafter, the device A 110 proceeds to step 1907 to determine whether a command to display a list is generated. The display of the list refers to a method of arranging the items in a pre-defined order irrespective of an angle. Namely, the device A 110 determines whether a button configured for the display of the list is selected by the user. When the command to display the list is not generated, the device A 110 proceeds to step 1911.

When the command to display the list is generated, the device A 110 proceeds to step 1909 to display the list of the neighboring devices. In other words, the device A 110 arrange the at least one item in a pre-defined order irrespective of an angle. For example, the at least one item can be displayed as in step 1709 of FIG. 17.

Thereafter, the device A 110 proceeds to step 1911 to determine whether the user selects at least one neighboring device. The user can select a neighboring device by a tap on an item. In this case, one or more items can be selected.

When the at least one neighboring device is selected, the device A 110 proceeds to step 1913 to display sharable content, namely, one or more files. For example, the device A 110 can display the files as in step 1609 of FIG. 16. In cases where a plurality of neighboring devices are selected, the device A 110 can display sharable files to all the selected neighboring devices such that the sharable files are distinguished from at least one remaining file. For example, at least one file that is unsuitable for sharing can be: shaded or blurred; set so as to not be selected; not displayed; or displayed together with an indicator for notifying that the file is not suitable to be shared.

Thereafter, the device A 110 proceeds to step 1915 to determine whether content is selected by the user and a command to execute sharing is generated. In this case, according to the selection of the file, the device A 110 can display the number of selected files. The number of selected files can be separately displayed according to the type of content. Furthermore, the command to execute sharing can be determined on the screen on which the content is displayed, or after a return is made from the screen on which the content is displayed to the screen on which the at least one neighboring device is displayed. When the command to execute sharing is not generated, the device A 110 returns to step 1913.

When the content is selected and the command to execute sharing is generated, the device A 110 proceeds to step 1917 to transmit the selected content to the selected at least one neighboring device. Since the beam training has been performed for the angle estimation in step 1903, the device A 110 can transmit the content using a transmission beam determined in step 1903. However, according to another embodiment of the present disclosure, the device A 110 can perform the beam training again and can transmit the content.

Figure 20:
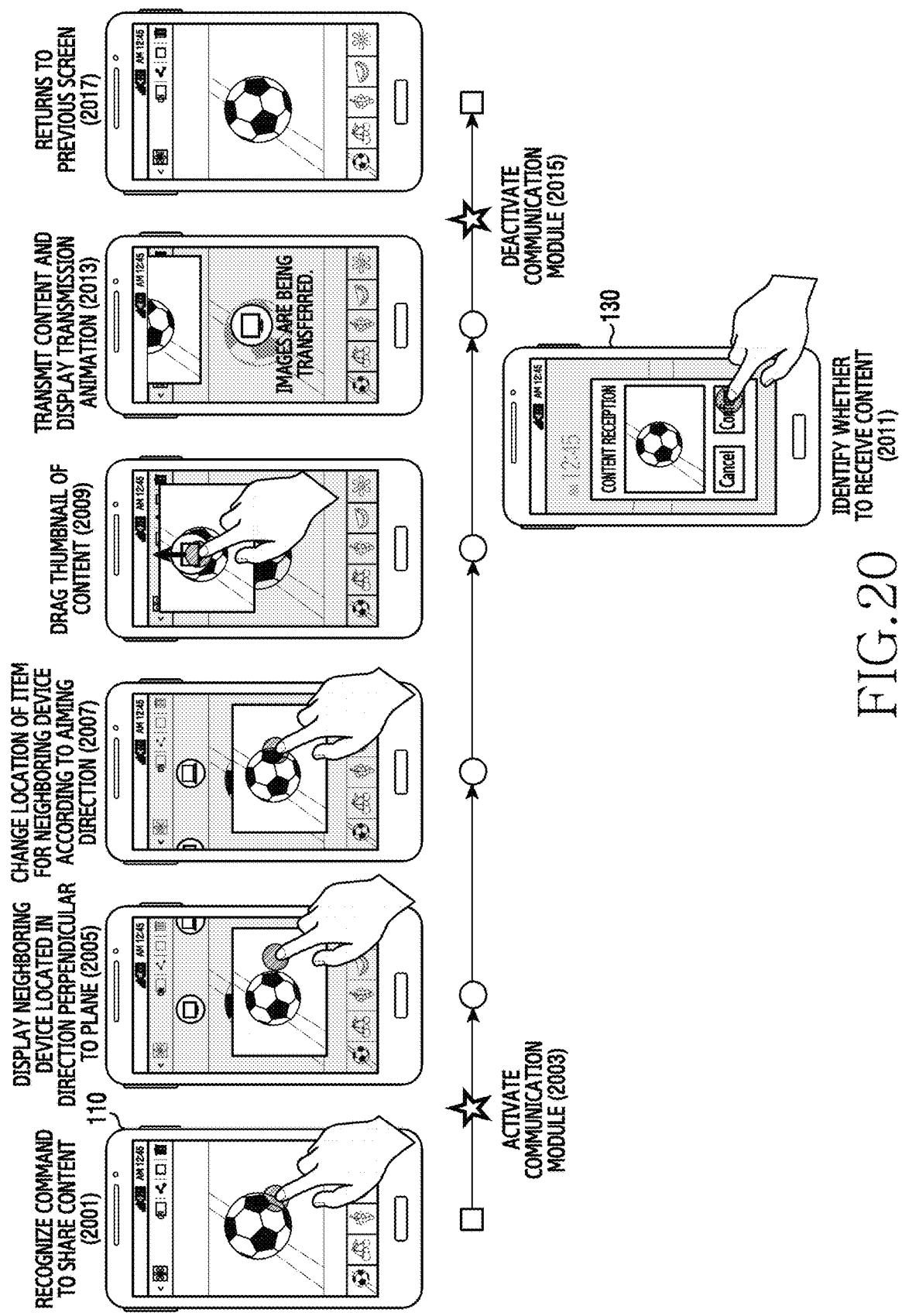
FIG. 20 illustrates an example of an interface for aiming direction based content sharing in an electronic device according to the present disclosure.

FIG. 20 illustrates an example of an interface for aiming direction based content sharing in an electronic device according to the present disclosure. FIG. 20 illustrates interfaces displayed on the device A 110 while sharing content.

Referring to FIG. 20, a command to share content is recognized in step 2001. Namely, the device A 110 displays content (e.g., a photograph) and detects a pre-defined user input to recognize the command to share the content. For example, the pre-defined user input can be defined as a long press for a predetermined period of time or more at a fixed point.

After the command to share the content is recognized, a communication module (e.g., the communication unit 710) of the device A 110 is activated in step 2003. The communication module is activated in order to estimate an angle for at least one neighboring device. Namely, the device A 110 estimates an angle for at least one neighboring device.

After the communication module is activated, at least one neighboring device located within a predetermined angle with respect to a direction perpendicular to a plane of the device A 110 is displayed in step 2005. Here, the plane is perpendicular to the front of the display panel of the device A 110, and the direction perpendicular to the plane is a direction parallel to the display panel. Namely, the direction perpendicular to the plane refers to a direction toward which the upper end of the device A 110 is directed. In the example of FIG. 20, one item for representing a device C 130 is displayed on the upper end of the device A 110.

After the neighboring device is displayed, in step 2007, the location of the item for the neighboring device (i.e., the device C 130) is changed according to the direction toward which the device A 110 is directed. When the direction toward which the device A 110 is directed changes, the angle for the device C 130 changes. Accordingly, the device A 110 moves the item on the screen according to the change of the angle. For example, when the aiming direction of the device A 110 moves to the right side of the device C 130, the angle for the device C 130 changes to the left so that the display location of the item can move to the left.

Thereafter, in step 2009, a drag for the content is generated. The user drags the content to the upper end of the device A 110 in order to transmit the content to the device C 130 indicated by the item. Namely, dragging the content to bring the content into contact with the item is defined as a command to transmit the content. Alternatively, according to another embodiment of the present disclosure, releasing a touch input after the content is brought into contact with the item, namely, a drag and drop of the content to the item can be defined as a command to transmit the content. Further, according to another embodiment of the present disclosure, a swipe directed toward the item can be defined as a command to transmit the content.

When the command to transmit the content is detected, a screen for identifying whether to receive the content is displayed on the device C 130 in step 2011. Namely, the device C 130 displays a screen for inquiring the user of the device C 130 as to whether to receive the content from the device A 110. The screen can include the thumbnail of the content and at least one button (e.g., a cancel button and an okay button) for entering an input as to whether to receive the content. However, according to another embodiment of the present disclosure, step 2011 can be omitted.

Thereafter, in step 2013, the content is transmitted, and an animation for notifying of the transmission is displayed. Namely, when detecting a command to transmit the content, the device A 110 transmits the content to the neighboring device. The animation can include at least one of an image, a graphic, and a text for notifying that the content is being transmitted. In addition, the animation can further include information on the neighboring device (e.g., a device type indicator, owner identification information, and the like). According to another embodiment of the present disclosure, the display of the animation can be omitted.

After the content is transmitted, the communication module (e.g., the communication unit 710) is deactivated in step 2015. Namely, although not illustrated in FIG. 20, the device A 110 transmits the content to the neighboring device indicated by the item corresponding to the drop location and deactivates the communication module.

After the communication module is deactivated, the previous screen returns in step 2017. In other words, the device A 110 returns to the state prior to the command to share the content in step 2001. Namely, the screen for displaying the shared content is displayed again.

Figure 21:
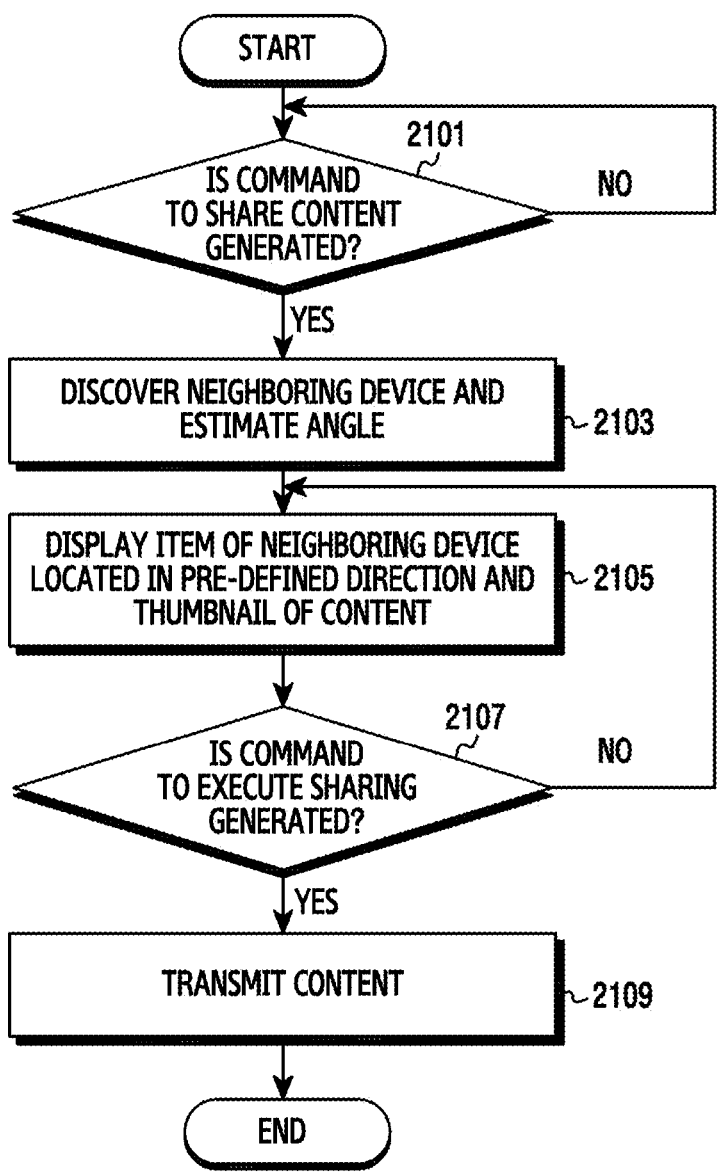
FIG. 21 is a flowchart illustrating an aiming direction based content sharing procedure of an electronic device according to the present disclosure.

FIG. 21 is a flowchart illustrating an aiming direction based content sharing procedure of an electronic device according to the present disclosure. FIG. 21 illustrates an operating method of the device A 110 for providing an interface as illustrated in FIG. 20.

Referring to FIG. 21, in step 2101, the device A 110 determines whether a command to share content is generated. The device A 110 can display content (e.g., a photograph, a video, etc.) and can detect a pre-defined user input to recognize the command to share the content. For example, the pre-defined user input can be defined as a long press for a predetermined period of time or more at a fixed point.

When the command to share the content is generated, the device A 110 proceeds to step 2103 to discover at least one neighboring device and estimate an angle for the at least one neighboring device. To this end, the device A 110 can transmit and receive a signal for the discovery. Furthermore, for the estimation of the angle, the device A 110 can: estimate channel values according to beams; calculate errors between the channel values and combinations of channel values of a plurality of candidate angles; and estimate an angle based on the angle of a beam determined through beam training and the errors. For example, the device A 110 can estimate the angle as illustrated in FIG. 10 or 11.

Next, the device A 110 proceeds to step 2105 to display at least one item of at least one neighboring device that is located within a predetermined angle in a pre-defined direction from the device A 110. For example, the pre-defined direction can be a direction perpendicular to a plane of the device A 110. The plane is perpendicular to the front of the display panel of the device A 110, and the direction perpendicular to the plane is a direction parallel to the display panel. Namely, the direction perpendicular to the plane refers to a direction toward which the upper end of the device A 110 is directed. For example, the device A 110 can display the thumbnail and the at least one item as in step 2005 of FIG. 20. In this case, when the angle for the at least one neighboring device changes as the device A 110 or the at least one neighboring device moves, the device A 110 moves the at least one item on the screen. Namely, a user of the device A 110 can be directed toward a target device in order to select the target device with which the content is to be shared so that the display location of the item can move.

Thereafter, the device A 110 proceeds to step 2107 to determine whether a command to execute sharing is generated. The command to execute sharing can be defined as a drag, drag and drop, or swipe for one item of the thumbnail. When the command to execute sharing is not generated, the device A 110 returns to step 2105.

When the command to execute sharing is generated, the device A 110 proceeds to step 2109 to transmit the selected content to the neighboring device indicated by the item. Since the beam training has been performed for the angle estimation in step 2103, the device A 110 can transmit the content using a transmission beam determined in step 2103. However, according to another embodiment of the present disclosure, the device A 110 can perform the beam training again and can transmit the content.

Figure 22:
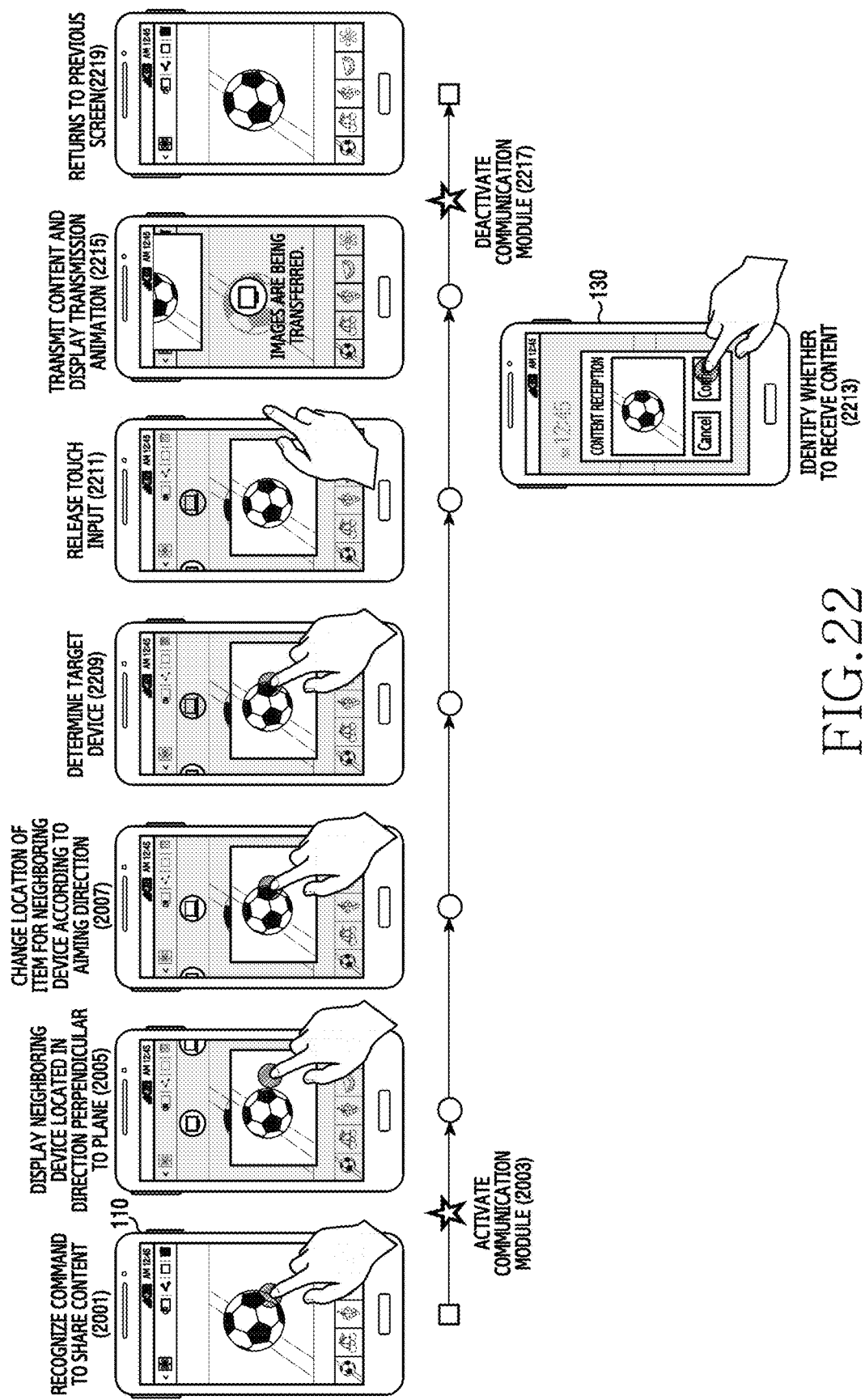
FIG. 22 illustrates another example of an interface for aiming direction based content sharing in an electronic device according to the present disclosure.

FIG. 22 illustrates another example of an interface for aiming direction based content sharing in an electronic device according to the present disclosure. FIG. 22 illustrates interfaces displayed on the device A 110 while sharing content.

Referring to FIG. 22, a command to share content is recognized in step 2201. Namely, the device A 110 displays content (e.g., a photograph) and detects a pre-defined user input to recognize the command to share the content. For example, the pre-defined user input can be defined as a long press for a predetermined period of time or more at a fixed point.

After the command to share the content is recognized, a communication module (e.g., the communication unit 710) of the device A 110 is activated in step 2203. The communication module is activated in order to estimate an angle for at least one neighboring device. Namely, the device A 110 estimates an angle for at least one neighboring device.

After the communication module is activated, at least one neighboring device located within a predetermined angle with respect to a direction perpendicular to a plane of the device A 110 is displayed in step 2205. Here, the plane is perpendicular to the front of the display panel of the device A 110, and the direction perpendicular to the plane is a direction parallel to the display panel. Namely, the direction perpendicular to the plane refers to a direction toward which the upper end of the device A 110 is directed. In the example of FIG. 22, one item for representing a device C 130 is displayed on the upper end of the device A 110.

After the neighboring device is displayed, in step 2207, the location of the item for the neighboring device (i.e., the device C 130) is changed according to the direction toward which the device A 110 is directed. When the direction toward which the device A 110 is directed changes, the angle for the device C 130 changes. Accordingly, the device A 110 moves the item on the screen according to the change of the angle. For example, when the aiming direction of the device A 110 moves to the right side of the device C 130, the angle for the device C 130 changes to the left so that the display location of the item can move to the left.

Thereafter, in step 2209, a target device to which the content is to be transmitted is determined. In the example of FIG. 22, the device A 110 is maintained for a predetermined period of time while being directed toward the device C 130. Accordingly, the device C 130 is determined to be the target device, and the item for the device C 130 is visually changed in order to inform a user of the determination of the target device. For example, at least one of the brightness, saturation, and color of the item for the device C 130 can be changed, or the item can blink. Alternatively, in order to inform the user of the determination of the target device, the device A 110 can output a notification tone together with, or by replacing, the visual change of the item. Namely, aiming for the specific different device for the predetermined period of time is defined as a command to determine the target device.

Thereafter, in step 2211, the touch input is released. The user releases the touch input in order to transmit the content to the device C 130 determined to be the target device. In other words, the user performs touch-off. Namely, in the state in which the target device is determined, the touch-off is defined as a command to transmit content.

When the command to transmit the content is detected, a screen for identifying whether to receive the content is displayed on the device C 130. Namely, the device C 130 displays a screen for inquiring the user of the device C 130 as to whether to receive the content from the device A 110. The screen can include the thumbnail of the content and at least one button (e.g., a cancel button and an okay button) for entering an input as to whether to receive the content. However, according to another embodiment of the present disclosure, the step 2211 can be omitted.

Thereafter, in step 2215, the content is transmitted, and an animation for notifying of the transmission is displayed. Namely, when detecting a command to transmit the content, the device A 110 transmits the content to the neighboring device. The animation can include at least one of an image, a graphic, and a text for notifying that the content is being transmitted. In addition, the animation can further include information on the neighboring device (e.g., a device type indicator, owner identification information, etc.). According to another embodiment of the present disclosure, the display of the animation can be omitted.

After the content is transmitted, the communication module (e.g., the communication unit 710) is deactivated in step 2217. Namely, although not illustrated in FIG. 22, the device A 110 transmits the content to the neighboring device indicated by the item corresponding to the drop location and deactivates the communication module.

After the communication module is deactivated, the previous screen returns in step 2219. In other words, the device A 110 returns to the state prior to the command to share the content in step 2201. Namely, the screen for displaying the shared content is displayed again.

Figure 23:
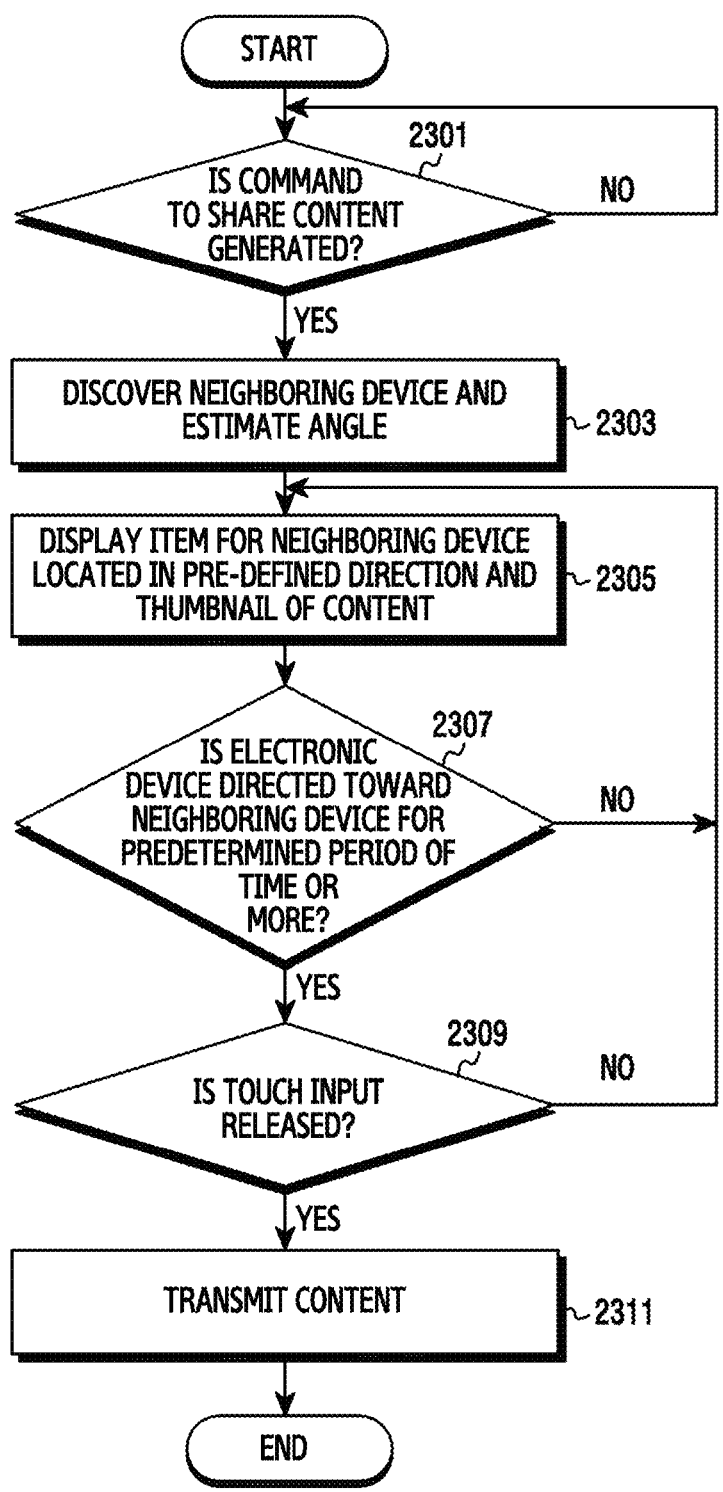
FIG. 23 is a flowchart illustrating an aiming direction based content sharing procedure of an electronic device according to the present disclosure.

FIG. 23 is a flowchart illustrating an aiming direction based content sharing procedure of an electronic device according to the present disclosure. FIG. 23 illustrates an operating method of the device A 110 for providing an interface as illustrated in FIG. 22.

Referring to FIG. 23, in step 2301, the device A 110 determines whether a command to share content is generated. The device A 110 can display content (e.g., a photograph, a video, etc.) and can detect a pre-defined user input to recognize the command to share the content. For example, the pre-defined user input can be defined as a long press for a predetermined period of time or more at a fixed point.

When the command to share the content is generated, the device A 110 proceeds to step 2303 to discover at least one neighboring device and estimate an angle for the at least one neighboring device. To this end, the device A 110 can transmit and receive a signal for the discovery. Furthermore, for the estimation of the angle, the device A 110 can: estimate channel values according to beams; calculate errors between the channel values and combinations of channel values of a plurality of candidate angles; and estimate an angle based on the angle of a beam determined through beam training and the errors. For example, the device A 110 can estimate the angle as illustrated in FIG. 10 or 11.

Next, the device A 110 proceeds to step 2305 to display at least one item of at least one neighboring device that is located within a predetermined angle in a pre-defined direction from the device A 110. For example, the pre-defined direction can be a direction perpendicular to a plane of the device A 110. The plane is perpendicular to the front of the display panel of the device A 110, and the direction perpendicular to the plane is a direction parallel to the display panel. Namely, the direction perpendicular to the plane refers to a direction toward which the upper end of the device A 110 is directed. For example, the device A 110 can display the thumbnail and the at least one item as in step 2205 of FIG. 22. In this case, when the angle for the at least one neighboring device changes as the device A 110 or the at least one neighboring device moves, the device A 110 moves the at least one item on the screen. Namely, a user of the device A 110 can be directed toward a target device in order to select the target device with which the content is to be shared so that the display location of the item can move.

Thereafter, the device A 110 proceeds to step 2307 to determine whether aiming for the specific neighboring device is maintained for a predetermined period of time or more. The maintenance of the aiming means that the neighboring device is not beyond a threshold angle range with respect to the pre-defined direction. In other words, the device A 110 determines whether the neighboring device is beyond the threshold angle range with respect to the pre-defined direction for the predetermined period of time or more. Specifically, when the neighboring device is within the threshold angle range with respect to the pre-defined direction, the device A 110 starts a timer for indicating the predetermined period of time and identifies whether the neighboring device is located within the threshold angle range with respect to the pre-defined direction until the time expires. When aiming for the neighboring device is not maintained for the predetermined period of time or more, the device A 110 returns to step 2305.

When aiming for the neighboring device is maintained for the predetermined period of time or more, the device A 110 proceeds to step 2309 to determine whether the touch input is released. Namely, while the target device is determined, the device A 110 identifies whether the touch input is released. In other words, the device A 110 determines whether a command to transmit the content to the target device is generated. When the touch input is not released, namely, when the touch input is maintained, the device A 110 returns to step 2305.

When the touch input is released, namely, when the command to execute sharing is generated, the device A 110 proceeds to step 2311 to transmit the selected content to the neighboring device indicated by the item. Since the beam training has been performed for the angle estimation in step 2303, the device A 110 can transmit the content using a transmission beam determined in step 2303. However, according to another embodiment of the present disclosure, the device A 110 can perform the beam training again and can transmit the content.

According to the various embodiments, a method of operating an electronic device comprises determining errors for candidate angles of channel measurement values corresponding to a plurality of beams for another device; determining distances between the angle of a beam determined by beam training with the other device and at least one candidate angle; and estimating an angle for the other device based on the distances and the errors.

In one example, the determining of the errors comprises calculating a Mean Square Error (MSE) between combinations of channel values of the candidate angles and the channel measurement values.

In another example, the determining of the distances comprises selecting at least one of the candidate angles based on the errors.

In yet another example, the selecting of the at least one candidate angle comprises selecting a pre-defined number of candidate angles that have small errors.

In yet another example, the estimating of the angle comprises: determining the weighted sum of an error and a distance for each candidate angle; and determining a candidate angle having the smallest weighted sum to be the angle.

In yet another example, determining a first weighting value for the errors and a second weighting value for the distances.

In yet another example, the determining of the first and second weighting values comprises: estimating an angle for a counterpart device located at a known angle; and determining the first and second weighting values based on the estimated angle and the known angle.

In yet another example, a method of operating an electronic device comprises determining errors for candidate angles of channel measurement values corresponding to a plurality of beams for another device; determining distances between the angle of a beam determined by beam training with the other device and at least one candidate angle; and estimating an angle for the other device based on the distances and the errors; and displaying an item for representing the other device as a target with which content is to be shared, wherein the item is displayed in a position corresponding to the angle for the other device within a screen.

In yet another example, a method of operating an electronic device comprises determining errors for candidate angles of channel measurement values corresponding to a plurality of beams for another device; determining distances between the angle of a beam determined by beam training with the other device and at least one candidate angle; and estimating an angle for the other device based on the distances and the errors; displaying a thumbnail of the content when a command to share content is generated; displaying an item for representing the other device around the thumbnail, wherein the item is displayed in a position corresponding to the angle for the other device within a screen; and transmitting the content to the other device when the thumbnail is dragged and dropped to the item.

In yet another example, a method of operating an electronic device comprises determining errors for candidate angles of channel measurement values corresponding to a plurality of beams for another device; determining distances between the angle of a beam determined by beam training with the other device and at least one candidate angle; and estimating an angle for the other device based on the distances and the errors; displaying a thumbnail of the content when a command to share content is generated; displaying an item for representing the other device around the thumbnail, wherein the item is displayed in a position corresponding to the angle for the other device within a screen; displaying another item for representing yet another device on the item such that the items overlap each other; and enlarging the interval between the item and the other item when the thumbnail is dragged and dropped to the item or the other item.

In yet another example, a method of operating an electronic device comprises determining errors for candidate angles of channel measurement values corresponding to a plurality of beams for another device; determining distances between the angle of a beam determined by beam training with the other device and at least one candidate angle; estimating an angle for the other device based on the distances and the errors; displaying an item for representing the other device when an application for content sharing is executed; and displaying sharable files when the item is selected, wherein the item is displayed in a position corresponding to the angle for the other device within a screen.

In yet another example, the displaying of the sharable files comprises: when a plurality of neighboring devices including the other device are selected, displaying at least one file that is to be shared by all the neighboring devices in such a manner that the at least one file is distinguished from at least one remaining file.

In yet another example, a method of operating an electronic device comprises determining errors for candidate angles of channel measurement values corresponding to a plurality of beams for another device; determining distances between the angle of a beam determined by beam training with the other device and at least one candidate angle; estimating an angle for the other device based on the distances and the errors; and displaying an item for representing the other device when the other device is located within a predetermined angle in a pre-defined direction from the electronic device, and a command to share content is generated, wherein the item is displayed in a position corresponding to the angle for the other device within a screen.

In yet another example, a method of operating an electronic device comprises determining errors for candidate angles of channel measurement values corresponding to a plurality of beams for another device; determining distances between the angle of a beam determined by beam training with the other device and at least one candidate angle; estimating an angle for the other device based on the distances and the errors; displaying an item for representing the other device when the other device is located within a predetermined angle in a pre-defined direction from the electronic device, and a command to share content is generated; and moving the item within the screen when the angle for the other device changes, wherein the item is displayed in a position corresponding to the angle for the other device within a screen.

In yet another example, a method of operating an electronic device comprises determining errors for candidate angles of channel measurement values corresponding to a plurality of beams for another device; determining distances between the angle of a beam determined by beam training with the other device and at least one candidate angle; estimating an angle for the other device based on the distances and the errors; and displaying an item for representing the other device when the other device is located within a predetermined angle in a pre-defined direction from the electronic device, and a command to share content is generated; and transmitting the content to the other device when the content is dragged toward the item, wherein the item is displayed in a position corresponding to the angle for the other device within a screen.

In yet another example, a method of operating an electronic device comprises determining errors for candidate angles of channel measurement values corresponding to a plurality of beams for another device; determining distances between the angle of a beam determined by beam training with the other device and at least one candidate angle; estimating an angle for the other device based on the distances and the errors; and displaying an item for representing the other device when the other device is located within a predetermined angle in a pre-defined direction from the electronic device, and a command to share content is generated; determining the other device to be a target to which the content is to be transmitted when aiming for the other device is maintained for a pre-defined period of time; and displaying an interface for representing that the other device is determined to be the target, wherein the item is displayed in a position corresponding to the angle for the other device within a screen.

In yet another example, a method of operating an electronic device comprises determining errors for candidate angles of channel measurement values corresponding to a plurality of beams for another device; determining distances between the angle of a beam determined by beam training with the other device and at least one candidate angle; estimating an angle for the other device based on the distances and the errors; and displaying an item for representing the other device when the other device is located within a predetermined angle in a pre-defined direction from the electronic device, and a command to share content is generated; determining the other device to be a target to which the content is to be transmitted when aiming for the other device is maintained for a pre-defined period of time; displaying an interface for representing that the other device is determined to be the target; and transmitting the content to the other device when a touch input for the content is released, wherein the item is displayed in a position corresponding to the angle for the other device within a screen.

Methods stated in claims and/or specifications according to various embodiments can be implemented by hardware, software, or a combination of hardware and software.

In the implementation of software, a computer-readable storage medium for storing one or more programs (software modules) can be provided. The one or more programs stored in the computer-readable storage medium can be configured for execution by one or more processors within the electronic device. The at least one program can include instructions that cause the electronic device to perform the methods according to various embodiments of the present disclosure as defined by the appended claims and/or disclosed herein.

The programs (software modules or software) can be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the can form a memory in which the program is stored. Further, a plurality of such memories can be included in the electronic device.

In addition, the programs can be stored in an attachable storage device which can access the electronic device through communication networks such as the Internet, Intranet, Local Area Network (LAN), Wide LAN (WLAN), and Storage Area Network (SAN) or a combination thereof. The storage devices can be connected to a device, which performs the present disclosure, through an external port. Further, a separate storage device on the communication network can be connected to a device which performs the present disclosure.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description can be configured into a single element or a single element in the description can be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a terminal comprising:
   determining errors between each of channel values measured through each of a plurality of beams of the terminal and each of preset channel values for each of the plurality of beams corresponding to a candidate angle;
   determining an angle difference between an angle of a beam determined among the plurality of beams through beam training with another terminal and the candidate angle; and
   determining an angle for the other terminal among a plurality of candidate angles including the candidate angle based on the angle difference and the errors.

2. The method of claim 1, wherein the determining of the errors comprises calculating a mean square error (MSE) between each of the channel values and each of the preset channel values,
   wherein the determining of the angle difference comprises selecting at least one candidate angle among the plurality of candidate angles based on the errors, and
   wherein the determining of the angle for the other terminal comprises determining a weighted sum of an error and the angle difference for each of the plurality of candidate angles and determining the candidate angle having a smallest weighted sum to be the angle for the other terminal.

3. The method of claim 2, wherein the selecting of the at least one candidate angle comprises selecting a pre-defined number of candidate angles that have errors smaller than a threshold.

4. The method of claim 1, further comprising:
   estimating an angle for a counterpart terminal located at a known angle; and
   determining a first weighting value for the errors and a second weighting value for the angle difference based on the estimated angle and the known angle.

5. The method of claim 1, further comprising:
displaying an item for representing the other terminal as a target with which content is to be shared,
wherein the item is displayed in a position corresponding to the angle for the other terminal within a screen.

6. The method of claim 1, further comprising:
displaying a thumbnail of content when a command to share content is generated;
displaying an item for representing the other terminal around the thumbnail; and
transmitting the content to the other terminal when the thumbnail is dragged and dropped to the item,
wherein the item is displayed in a position corresponding to the angle for the other terminal within a screen.

7. The method of claim 1, further comprising:
displaying a thumbnail of content when a command to share content is generated;
displaying an item for representing the other terminal around the thumbnail;
displaying another item for representing yet another terminal on the item such that the items overlap each other; and
enlarging an interval between the item and the other item when the thumbnail is dragged and dropped to the item or the other item,
wherein the item is displayed in a position corresponding to the angle for the other terminal within a screen.

8. The method of claim 1, further comprising:
displaying an item for representing the other terminal when an application for content sharing is executed; and
displaying sharable files when the item is selected,
wherein the item is displayed in a position corresponding to the angle for the other terminal within a screen,
wherein the displaying of the sharable files comprises when a plurality of neighboring devices including the other terminal are selected, displaying at least one file to be shared by all of the plurality of neighboring devices in such a manner that the at least one file is distinguished from at least one remaining file.

9. The method of claim 1, further comprising:
displaying an item for representing the other terminal when the other terminal is located within a predetermined angle in a pre-defined direction from the terminal, and a command to share content is generated;
moving the item within a screen when the angle for the other terminal changes; and
transmitting the content to the other terminal when the content is dragged toward the item,
wherein the item is displayed in a position corresponding to the angle for the other terminal within a screen.

10. The method of claim 9, further comprising:
determining the other terminal to be a target to which the content is to be transmitted when aiming for the other terminal is maintained for a pre-defined period of time;
displaying an interface for representing that the other terminal is determined to be the target; and
transmitting the content to the other terminal when a touch input for the content is released.

11. A terminal comprising:
a processor configured to:
determine errors between each of channel values measured through each of a plurality of beams of the terminal and each of preset channel values for each of the plurality of beams corresponding to a candidate angle,
determine an angle difference between an angle of a beam determined among the plurality of beams through beam training with another terminal and the candidate angle, and
determine an angle for the other terminal among a plurality of candidate angles including the candidate angle based on the angle difference and the errors.

12. The terminal of claim 11, wherein the processor configured to:
calculate a mean square error (MSE) between each of the channel values and each of the preset channel values,
select at least one candidate angle among the plurality of candidate angles based on the errors, and
determine a weighted sum of an error and the angle difference for each of the plurality of candidate angles and determining the candidate angle having a smallest weighted sum to be the angle for the other terminal.

13. The terminal of claim 12, wherein the processor configured to:
select a pre-defined number of candidate angles having errors smaller than a threshold to be the at least one candidate angle.

14. The terminal of claim 11, wherein the processor configured to:
estimate an angle for a counterpart terminal located at a known angle, and determine a first weighting value for the errors and a second weighting value for the angle difference based on the estimated angle and the known angle.

15. The terminal of claim 11, further comprising:
a display unit configured to display an item for representing the other terminal as a target with which content is to be shared,
wherein the item is displayed in a position corresponding to the angle for the other terminal within a screen.

16. The terminal of claim 11, further comprising:
at least one transceiver; and
a display unit configured to:
display a thumbnail of content when a command to share content is generated, and
display an item for representing the other terminal around the thumbnail;
wherein the at least one transceiver is further configured to transmit the content to the other terminal when the thumbnail is dragged and dropped to the item,
wherein the item is displayed in a position corresponding to the angle for the other terminal within a screen.

17. The terminal of claim 11, further comprising:
a display unit configured to:
display a thumbnail of content when a command to share content is generated,
display an item for representing the other terminal around the thumbnail,
display another item for representing yet another terminal on the item such that the items overlap each other, and
enlarge an interval between the item and the other item when the thumbnail is dragged and dropped to the item or the other item,
wherein the item is displayed in a position corresponding to the angle for the other terminal within a screen.

18. The terminal of claim 11, further comprising:
a display unit configured to:
display an item for representing the other terminal when an application for content sharing is executed, and display sharable files when the item is selected,
wherein the item is displayed in a position corresponding to the angle for the other terminal within a screen,
wherein the displaying of the sharable files comprises when a plurality of neighboring devices including the other terminal are selected, displaying at least one file to be shared by all of the plurality of neighboring devices in such a manner that the at least one file is distinguished from at least one remaining file.

19. The terminal of claim 11, further comprising:
at least one transceiver; and
a display unit configured to:
  display an item for representing the other terminal when the other terminal is located within a predetermined angle in a pre-defined direction from the terminal, and a command to share content is generated, and
  move the item within a screen when the angle for the other terminal changes,
  wherein the at least one transceiver is further configured to transmit the content to the other terminal when the content is dragged toward the item,
  wherein the item is displayed in a position corresponding to the angle for the other terminal within a screen.

20. The terminal of claim 19, further comprising a display unit and at least one transceiver,
  wherein the processor is further configured to
    determine the other terminal to be a target to which the content is to be transmitted when aiming for the other terminal is maintained for a pre-defined period of time,
  wherein the display unit is configured to display an interface for representing that the another terminal is determined to be the target, and
  wherein the at least one transceiver is further configured to transmit the content to the other terminal when a touch input for the content is released.

* * * * *